(12) United States Patent
Campbell et al.

(10) Patent No.: US 10,669,383 B2
(45) Date of Patent: Jun. 2, 2020

(54) SPHERONIZED POLYMER PARTICLES

(75) Inventors: Jason N. Campbell, Helena, AL (US);
Bruce W. Hudson, Pleasant Grove, AL (US)

(73) Assignee: Evonik Corporation, Parsippany, NJ (US)

( * ) Notice: Subject to any disclaimer, the term of this patent is extended or adjusted under 35 U.S.C. 154(b) by 1150 days.

(21) Appl. No.: 11/928,559

(22) Filed: Oct. 30, 2007

(65) Prior Publication Data

US 2008/0103277 A1    May 1, 2008

Related U.S. Application Data

(60) Provisional application No. 60/855,551, filed on Oct. 31, 2006.

(51) Int. Cl.
| | | |
|---|---|---|
| *C08J 3/12* | (2006.01) | |
| *C08G 63/90* | (2006.01) | |
| *B29B 9/16* | (2006.01) | |

(52) U.S. Cl.
CPC .............. *C08J 3/12* (2013.01); *B29B 9/16* (2013.01); *C08G 63/90* (2013.01); *B29B 2009/166* (2013.01); *C08J 2367/04* (2013.01)

(58) Field of Classification Search
CPC .............................. C08J 3/12; C08J 2367/04
USPC ................................................. 427/2.14, 220
See application file for complete search history.

(56) References Cited

U.S. PATENT DOCUMENTS

| | | | |
|---|---|---|---|
| 3,586,654 A * | 6/1971 | Lerman et al. .......... | 430/137.18 |
| 3,600,354 A | 8/1971 | Kunze et al. ................... | 260/40 |
| 3,622,555 A | 11/1971 | Rothenbury et al. ........ | 260/94.9 |
| 3,740,359 A | 6/1973 | Garner | |
| 3,856,900 A | 12/1974 | Erb .................................. | 264/9 |
| 3,896,196 A | 7/1975 | Dickey et al. .................... | 264/6 |
| 4,148,768 A | 4/1979 | McClain ..................... | 260/23 H |
| 4,150,003 A | 4/1979 | McClain ..................... | 260/23 H |
| 4,151,133 A | 4/1979 | McClain ..................... | 260/23 H |
| 4,200,601 A | 4/1980 | McClain .......................... | 264/9 |
| 4,252,969 A | 2/1981 | Broering et al. ............. | 528/492 |
| 4,267,310 A | 5/1981 | Landoll ...................... | 260/40 R |
| 4,329,304 A | 5/1982 | McClain .......................... | 264/8 |
| 4,329,305 A | 5/1982 | McClain .......................... | 264/8 |
| 4,336,210 A | 6/1982 | McClain .......................... | 264/8 |
| 4,525,345 A | 6/1985 | Dunn et al. ..................... | 424/22 |
| 4,526,938 A * | 7/1985 | Churchill et al. ............ | 525/415 |
| 4,758,435 A | 7/1988 | Schaaf | |

(Continued)

FOREIGN PATENT DOCUMENTS

| | | |
|---|---|---|
| EP | 289034 | 4/1988 |
| EP | 747069 | 12/1996 |

(Continued)

OTHER PUBLICATIONS

Bennette, Plasticizer, Glossary of terms use in the paint industry, http://www.bennette.com/glossary/#p, Sep. 21, 2009.*

(Continued)

*Primary Examiner* — Tabatha L Penny

(74) *Attorney, Agent, or Firm* — Linda S. Li; Jason S. Ngui

(57) ABSTRACT

Spheroid polymer particles are prepared from non-spheroid particles by heating the non-spheroid particles in a liquid medium to a temperature that is above the glass transition temperature or the melting temperature of the polymer and then cooling.

23 Claims, 14 Drawing Sheets

(56) References Cited

U.S. PATENT DOCUMENTS

| | | | |
|---|---|---|---|
| 4,923,649 A | 5/1990 | Hsieh et al. ............... 264/37 |
| 4,975,280 A | 12/1990 | Schacht et al. ............ 424/428 |
| 5,075,115 A | 12/1991 | Brine ........................ 424/486 |
| 5,096,826 A | 3/1992 | Barbic et al. |
| 5,098,443 A | 3/1992 | Parel et al. |
| 5,110,717 A | 5/1992 | Czekai ....................... 430/512 |
| 5,290,913 A | 3/1994 | McAllister et al. |
| 5,360,616 A | 11/1994 | Garza Flores et al. ....... 424/489 |
| 5,439,688 A | 8/1995 | Orsolini et al. |
| 5,492,697 A | 2/1996 | Boyan et al. |
| 5,500,161 A | 3/1996 | Andrianov et al. ............ 264/8 |
| 5,512,303 A | 4/1996 | Garza Flores et al. ....... 424/489 |
| 5,538,733 A | 7/1996 | Emery et al. |
| 5,540,868 A | 7/1996 | Stouffer et al. .............. 264/13 |
| 5,633,014 A | 5/1997 | Garza Flores et al. ....... 424/489 |
| 5,716,413 A | 2/1998 | Walter et al. |
| 5,716,640 A | 2/1998 | Kamei et al. ................ 424/451 |
| 5,855,915 A | 1/1999 | Pinkus ........................ 424/486 |
| 5,858,531 A | 1/1999 | Chenite et al. ............... 428/402 |
| 5,863,297 A | 1/1999 | Walter et al. |
| 5,879,714 A | 3/1999 | Sherman ..................... 424/489 |
| 5,916,597 A * | 6/1999 | Lee et al. ..................... 424/501 |
| 5,962,566 A | 10/1999 | Grandfils et al. ............. 524/378 |
| 5,977,204 A | 11/1999 | Boyan et al. |
| 5,981,619 A | 11/1999 | Shikinami et al. |
| 6,020,004 A | 2/2000 | Shah ............................ 424/501 |
| 6,039,762 A | 3/2000 | McKay |
| 6,045,788 A | 4/2000 | Smith |
| 6,083,522 A | 7/2000 | Chu et al. |
| 6,121,278 A | 9/2000 | Jackson et al. |
| 6,153,129 A | 11/2000 | Herbert et al. ................... 264/5 |
| 6,190,700 B1 | 2/2001 | Okada et al. ................ 424/499 |
| 6,201,020 B1 | 3/2001 | Zhang et al. |
| 6,217,911 B1 | 4/2001 | Vaugn et al. ................. 424/501 |
| 6,262,127 B1 | 7/2001 | Acemoglu et al. ......... 514/772.7 |
| 6,268,053 B1 * | 7/2001 | Woiszwillo et al. .......... 428/402 |
| 6,342,250 B1 | 1/2002 | Masters ....................... 424/484 |
| 6,352,667 B1 | 3/2002 | English |
| 6,358,443 B1 | 3/2002 | Herbert et al. ................... 264/5 |
| 6,380,193 B1 | 4/2002 | Li et al. |
| 6,387,902 B1 | 5/2002 | Zhang et al. |
| 6,395,749 B1 | 5/2002 | Li et al. |
| 6,432,438 B1 | 8/2002 | Shukla ........................ 424/426 |
| 6,451,335 B1 | 9/2002 | Goldenheim et al. ......... 424/426 |
| 6,479,065 B2 | 11/2002 | Jaworowicz et al. |
| 6,509,313 B1 | 1/2003 | Smith |
| 6,514,983 B1 | 2/2003 | Li et al. |
| 6,524,997 B1 | 2/2003 | Higo et al. ................... 502/439 |
| 6,528,097 B1 | 3/2003 | Vaughn et al. ............... 424/501 |
| 6,545,011 B2 | 4/2003 | Li et al. |
| 6,547,719 B1 | 4/2003 | Atala et al. |
| 6,548,002 B2 | 4/2003 | Gresser et al. |
| 6,551,532 B1 | 4/2003 | Boissier et al. .................. 264/5 |
| 6,569,463 B2 | 5/2003 | Patel et al. ................... 424/497 |
| 6,620,356 B1 | 9/2003 | Wong et al. |
| 6,626,942 B1 | 9/2003 | Edberg |
| 6,626,950 B2 | 9/2003 | Brown et al. |
| 6,635,786 B2 | 10/2003 | Li et al. |
| 6,676,933 B2 * | 1/2004 | Vergez et al. ............... 424/78.01 |
| 6,699,908 B2 | 3/2004 | Sackler et al. ................. 514/563 |
| 6,709,452 B1 | 3/2004 | Valimaa et al. |
| 6,716,828 B1 | 4/2004 | Li et al. |
| 6,723,733 B2 | 4/2004 | Li et al. |
| 6,726,860 B2 | 4/2004 | Herbert et al. ................... 264/5 |
| 6,759,431 B2 * | 7/2004 | Hunter et al. ................. 514/449 |
| 6,767,550 B1 | 7/2004 | Genin et al. |
| 6,783,712 B2 | 8/2004 | Slivka et al. |
| 6,800,672 B2 | 10/2004 | Dang et al. ................... 523/113 |
| 6,908,582 B2 | 6/2005 | Shikinami et al. |
| 6,951,956 B2 | 10/2005 | Yamane et al. ............... 562/587 |
| 7,029,700 B2 | 4/2006 | Mathiowitz ................. 424/489 |
| 7,037,450 B2 | 5/2006 | Herbert et al. ..................... 264/5 |
| 7,048,946 B1 | 5/2006 | Wong et al. .................. 424/486 |
| 7,329,723 B2 * | 2/2008 | Jernigan et al. .............. 528/480 |
| 2002/0135085 A1 | 9/2002 | Herbert et al. .................... 264/5 |
| 2003/0004257 A1 | 1/2003 | Kondo et al. ................. 524/495 |
| 2003/0060374 A1 | 3/2003 | Cooke et al. ................. 507/200 |
| 2003/0190406 A1 | 10/2003 | Hossainy et al. ............ 427/2.25 |
| 2004/0039441 A1 | 2/2004 | Rowland et al. ............ 623/1.42 |
| 2004/0097565 A1 | 5/2004 | Terashita et al. ............. 514/364 |
| 2004/0146540 A1 | 7/2004 | Ueda et al. |
| 2004/0241205 A1 | 12/2004 | Babich et al. ................ 424/426 |
| 2004/0254152 A1 | 12/2004 | Monje et al. ................. 514/165 |
| 2005/0048098 A1 | 3/2005 | Wong et al. .................. 424/426 |
| 2005/0065318 A1 | 3/2005 | Jernigan et al. |
| 2005/0084536 A1 | 4/2005 | Van Buitenen et al. ....... 424/489 |
| 2005/0106257 A1 | 5/2005 | Albayrak ..................... 424/489 |
| 2005/0154183 A1 | 7/2005 | Ekart et al. ................... 528/486 |
| 2005/0208095 A1 | 9/2005 | Hunter et al. ................. 424/423 |
| 2005/0209704 A1 | 9/2005 | Maspero et al. |
| 2005/0220887 A1 | 10/2005 | Herbert et al. ............... 424/489 |
| 2005/0272613 A1 | 12/2005 | Cooke et al. ................. 507/219 |
| 2006/0002979 A1 | 1/2006 | Ashammakhi et al. ....... 424/426 |
| 2006/0073182 A1 | 4/2006 | Wong et al. .................. 424/426 |
| 2006/0100679 A1 | 5/2006 | DiMauro et al. ............... 607/94 |
| 2007/0162110 A1 | 7/2007 | Dave |
| 2008/0145403 A1 | 6/2008 | Spada et al. |
| 2010/0113615 A1 | 5/2010 | Boyden et al. |
| 2010/0311638 A1 | 12/2010 | Tiege |
| 2011/0034418 A1 | 2/2011 | Beltz et al. |
| 2012/0177697 A1 | 7/2012 | Chen |
| 2012/0187594 A1 | 7/2012 | Utkhede et al. |

FOREIGN PATENT DOCUMENTS

| | | | |
|---|---|---|---|
| EP | 1131114 | 6/2000 | |
| EP | 1132080 | 9/2001 | |
| EP | 1356815 | 10/2003 | |
| EP | 1554990 | 7/2005 | |
| EP | 1637164 | 3/2006 | |
| JP | 55-065233 A | 5/1980 | |
| JP | 07-316311 A | 12/1995 | |
| JP | 11-080371 A | 3/1999 | |
| JP | 2000-103865 | 4/2000 | |
| JP | 2003-073233 A | 3/2003 | |
| WO | WO 199215286 | 9/1992 | |
| WO | WO-1993/018754 A1 | 9/1993 | |
| WO | WO 199405265 | 3/1994 | |
| WO | WO 1996038174 | 12/1996 | |
| WO | WO-2001/036583 A1 | 5/2001 | |
| WO | WO 02/035991 | 5/2002 | |
| WO | WO-2002/043785 A2 | 6/2002 | |
| WO | WO0235991 * | 10/2002 | ............... A61K 9/16 |
| WO | WO-2003/037337 A1 | 5/2003 | |
| WO | WO-2003/047349 A1 | 6/2003 | |
| WO | WO 2004112748 | 12/2004 | |
| WO | WO-2005/000277 A1 | 1/2005 | |
| WO | WO-2006/116546 A1 | 11/2006 | |
| WO | WO 2008/049241 | 5/2008 | |

OTHER PUBLICATIONS

Mallinckrodt Baker, Inc., Polyethylene Glycol MSDS, Nov. 21, 2008.*

Chun, Biodegradable PLGA Microcarriers for Injectable Delivery of Chondrocytes: Effect of Surface Modification on Cell Attachment and Function, Biotechnol. Prog. 2004, 20, p. 1797-1801.*

Çaliş et al., "Influence of irradiation sterilization on poly(lactide-co-glycolide) microspheres containing anti-imflammatory drugs," *Il Farmaco* 57:55-62 (2002).

Bozdağ et al., "In vitro evaluation and intra-articular administration of biodegradable microspheres containing naproxen sodium," *J Microencapsulation* 18(4):443-456 (2001).

Fernández-Carballido et al., "Biodegradable ibuprofen-loaded PLGA microspheres for intraarticular administration: Effect of Labrafil addition on release in vitro," *Inter J Pharm* 279:33-41 (2004).

Freitas et al., "Nimesulide PLA microspheres as a potential sustained release system for the treatment of inflammatory diseases," *Inter J Pharm* 295:201-211 (2005).

Frazier et al., "Inhibition of cerebral vasospasm by intracranial delivery of ibuprofen from a controlled-release polymer in a rabbit model of subarachnoid hemorrhage," *J Neurosurg* 101:93-98 (2004).

(56) References Cited

OTHER PUBLICATIONS

Gavini et al., "Compressed biodegradable matrices of spray-dried PLGA microspheres for the modified release of ketoprofen," *J Microencapsulation* 20(2):193-201 (2003).

Kofuji et al., "Therapeutic efficacy of sustained drug release from chitosan gel on local inflammation," *Inter J Pharm* 272:65-78 (2004).

Ladrón de Guevara-Fernández et al., "Bioactive glass-polymer materials for controlled release of ibuprofen," *Biomaterials* 24:4037-4043 (2003).

Samati et al., "Preparation and characterization of poly(D,L-Lactic-Co-Glycolic Acid) microspheres containing flurbiprofen sodium," *Drug Delivery* 13:105-111 (2006).

Yoon et al., "Dexamethasone-releasing biodegradable polymer scaffolds fabricated by a gas-foaming/salt-leaching method," *Biomaterials* 24: 2323-2329 (2003).

International Search Report for PCT/US2007/022885 published Sep. 12, 2008.

Written Opinion of International Searching Authority for PCT/US2007/022885 dated May 5, 2009.

Non-Final Office Action dated Dec. 11, 2012 for U.S. Appl. No. 13/173,021, filed Jun. 30, 2011 (Inventor—Markland et al.; pp. 1-9).

Response to Non-Final Office Action filed on Mar. 11, 2013 for U.S. Appl. No. 13/173,021, filed Jun. 30, 2011 (Inventor—Markland et al.; pp. 1-11).

European Search Report in EP 10170181 dated Aug. 30, 2010.

Official Action dated Aug. 7, 2012 for JP Pat. App. No. 2009-534697, which is national phase of Intl. App. No. PCT/US2007/022885, filed on Oct. 30, 2007 (Inventor—Campbell et al.; Applicant—Surmodics Pharmaceuticals, Inc.; pp. 1-5).

International Preliminary Report on Patentability issued by International Bureau of WIPO dated May 5, 2009 for Intl. App. No. PCT/US2007/022885, filed on Oct. 30, 2007 (Inventor—Campbell et al.; Applicant—Surmodics Pharmaceuticals, Inc.; pp. 1-8).

Communication about intention to grant European patent issued by European Patent Office dated Feb. 8, 2010 for EP Pat. App. No. 07853022.7, which is national phase of Intl. App. No. PCT/US2007/022885, filed on Oct. 30, 2007 (Inventor—Campbell et al.; Applicant—Surmodics Pharmaceuticals, Inc.; pp. 1-5).

Reply to Communication from Examining Division filed by Applicant dated Dec. 30, 2009 for EP Pat. App. No. 07853022.7, which is national phase of Intl. App. No. PCT/US2007/022885, filed on Oct. 30, 2007 (Inventor—Campbell et al.; Applicant—Surmodics Pharmaceuticals, Inc.; pp. 1-27).

Communication from Examining Division issued by European Patent Office dated Aug. 21, 2009 for EP Pat. App. No. 07853022.7, which is national phase of Intl. App. No. PCT/US2007/022885, filed on Oct. 30, 2007 (Inventor—Campbell et al.; Applicant—Surmodics Pharmaceuticals, Inc.; pp. 1-2).

Preliminary Amendment filed by Applicant dated Jul. 9, 2009 for EP Pat. App. No. 07853022.7, which is national phase of Intl. App. No. PCT/US2007/022885, filed on Oct. 30, 2007 (Inventor—Campbell et al.; Applicant—Surmodics Pharmaceuticals, Inc.; pp. 1-8).

Communication about intention to grant European patent issued by European Patent Office dated May 23, 2011 for EP Pat. App. No. 10170181.1 which is national phase of Intl. App. No. PCT/US2007/022885, filed on Oct. 30, 2007 (Inventor—Campbell et al.; Applicant—Surmodics Pharmaceuticals, Inc.; pp. 1-5).

Preliminary Amendment filed by Applicant dated Apr. 6, 2011 for EP Pat. App. No. 10170181.1 which is national phase of Intl. App. No. PCT/US2007/022885, filed on Oct. 30, 2007 (Inventor—Campbell et al.; Applicant—Surmodics Pharmaceuticals, Inc.; pp. 1-29).

International Search Report and Written Opinion issued by International Searching Authority of WIPO dated Oct. 10, 2011 for Intl. App. No. PCT/US2011/042345, filed on Jun. 29, 2011 (Inventor—Markland et al.; Applicant—Surmodics Pharmaceuticals, Inc.; pp. 1-14).

Hagan, S. A. et al., "Estimation of the Poly(ethylene glycol) Chain Length of L-Polyactide-Polyethylene Glycol in Aqueous Dispersions Using Viscoelastic Measurements," Langmuir, 11: 1482-1485, (1995).

Steendam, R. et al., "Poly(dl-lactic acid) as a direct compression excipient in controlled release tablets: Part I. Compaction behaviour and release characteristics of poly(dl-lactic acid) matrix tablets," Journal of Pharmaceutics, 175: 33-46, (1998).

* cited by examiner

SPHERONIZED POLYMER PARTICLES

CROSS REFERENCE TO RELATED APPLICATIONS

This application claims the benefit of priority to U.S. Provisional Application No. 60/855,551, filed on Oct. 31, 2006, which is incorporated by reference herein in its entirety.

BACKGROUND

Polymer particles have a multitude of uses. They can be used in medical settings as carriers for drugs and vaccines in order to affect the timing, location, and release profile of drug delivery and action. Polymer particles can also be used as diagnosis aids to carry imaging and contrast agents. There are also many industrial uses for polymer particles, such as in paints, coatings, and sealants.

The shape of a polymer particle can be of utmost importance to its suitability for a particular use. As such, there are many methods for preparing polymer particles of a particular morphology and also for processing a particle (e.g., grinding, cutting, milling, etc.) to obtain a desired shape. Oftentimes, the result of preparing a particular polymer particle or of processing that particle is a rough and/or jagged particle surface. Such irregularly shaped particles can have several disadvantages, such as great variability in the release profile and dosing of a drug within the particle. Other problems can relate to delivery (e.g., clotting and clumping). As such, it can be desired to take a polymer particle and change its morphology to result in a more uniform shape. The methods disclosed herein meet these and other needs.

SUMMARY

In accordance with the purposes of the disclosed materials, compositions, articles, devices, and methods, as embodied and broadly described herein, the disclosed subject matter, in one aspect, relates to compounds and compositions and methods for preparing and using such compounds and compositions. Also, disclosed are polymer particles and methods of making and using such particles.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
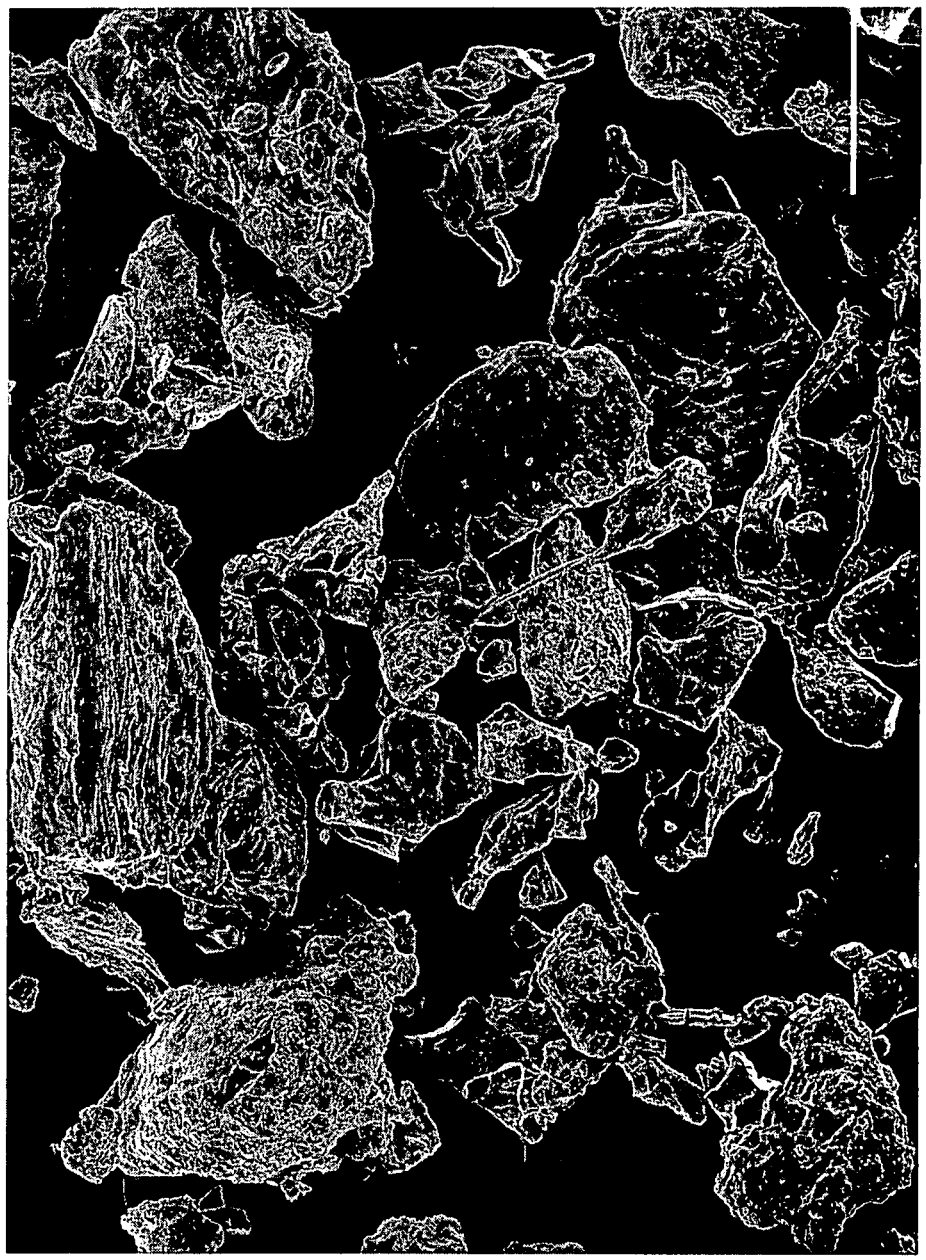
FIG. 1 is a SEM photomicrograph of sieved polymer particles of a 75:25 PLG (7525 DLG 6A) from Lakeshore Biomaterials (Birmingham, Ala.) prior to spheronization treatment (scale bar represents 0.25 mm).
Figure 2:
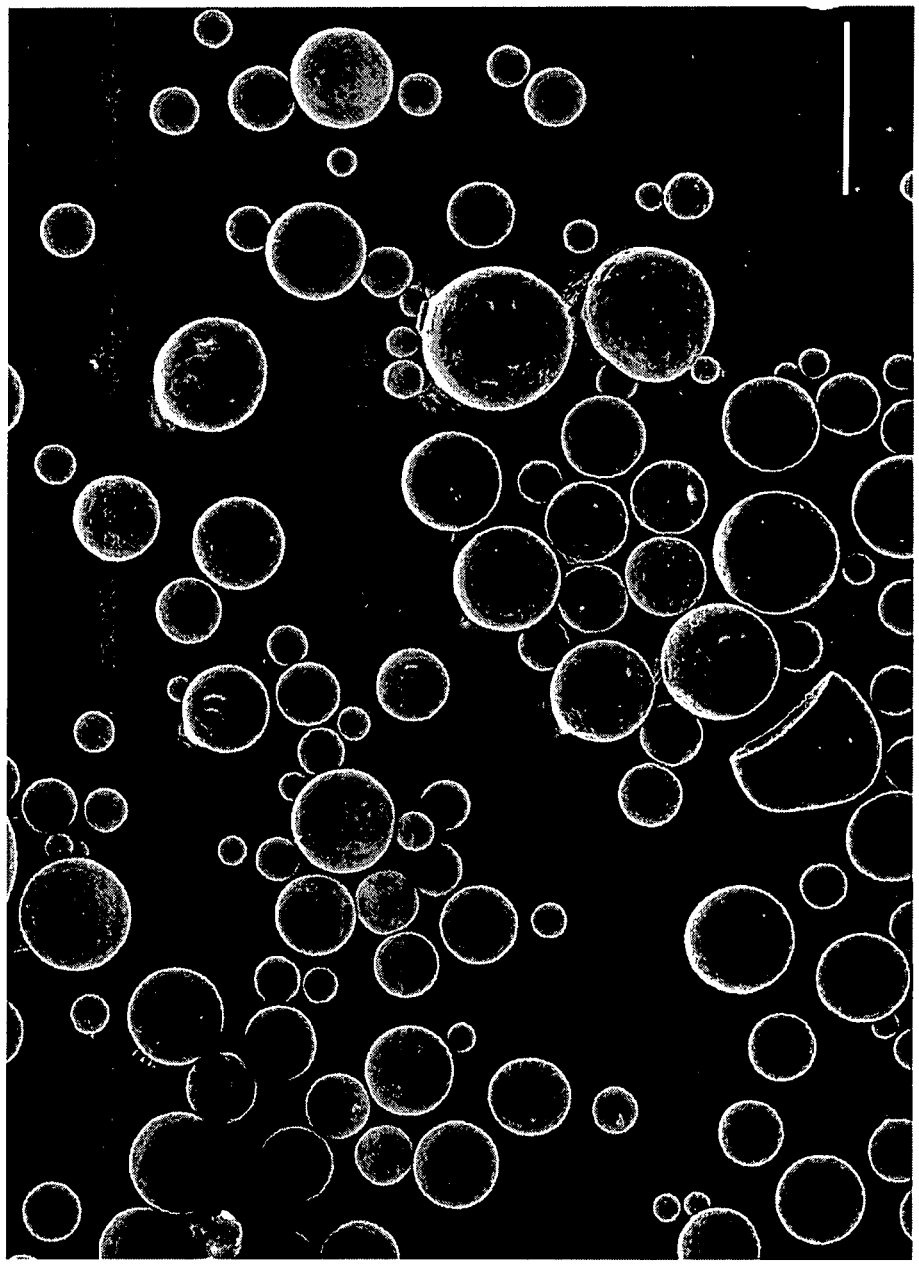
FIG. 2 is a SEM photomicrograph of sieved polymer particles of a 75:25 PLG (7525 DLG 6A) from Lakeshore Biomaterials (Birmingham, Ala.) after spheronization treatment as described in Example 4 (scale represents 0.25 mm).

The materials, compounds, compositions, articles, and methods described herein may be understood more readily by reference to the following detailed description of specific aspects of the disclosed subject matter, the Figures, and the Examples included therein.

Before the present materials, compounds, compositions, articles, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a compound" includes mixtures of two or more such compounds, reference to "an agent" includes mixtures of two or more such agents, reference to "the polymer" includes mixtures of two or more such polymers, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

By the term "polymer particle" is meant any piece or segment of polymer. It is not meant to imply any particular size of particle, as the polymer particle can be of any size such as microscopic pieces, powders, to visible grains. Further, it is not meant to imply any particular shape, as a polymer particle can have any shape.

The term "spheroid" is used herein to describe the shape of polymer particles after they have been treated by the disclosed spheronization processes. Specifically, polymer particles that have rough surfaces, jagged edges, and/or sharp corners can be modified by the disclosed spheronization processes to result in "spheroid" polymer particles with smoothed surfaces, rounded edges and corners, and a generally orbicular shape. As such, the term "spheroid" is not meant to imply that such particles have only a perfectly spherical shape. In fact, in most cases they will not. Likewise, the terms "spheronized" and "spheronization" is not meant to relate to just a perfectly spherical shape. The terms "spheroid," "spheronized," and "spheronization" instead refer to a generally spherical shape, for example, a globule, egg, or bead shape. These terms also relate to an elongated sphere shape such as a capsule or rod shape. Further, these terms also relate to a flattened sphere that has a disk, pill, or pellet shape. In many examples, the "spheroid" and "spheronized" polymer particles disclosed herein have a smaller proportion of rough surfaces than the polymer particle prior to treatment according to the disclosed spheronization processes.

The term "non-spheroid" is used herein to describe the shape of a polymer particle that is other than "spheroid," as defined above. Particularly, "non-spheroid" particles are those that have not been treated by the disclosed spheronization processes. As such, "non-spheroid" particles have rough surfaces, jagged edges, and/or sharp corners. In many examples, "non-spheroid" polymer particles disclosed herein have a higher proportion of rough surfaces than the polymer particle after it is treated according to the disclosed spheronization processes.

The term "bioactive agent" is used herein to refer to a compound or composition that is capable of providing a local or systemic biological, physiological, or therapeutic effect in the biological system to which it is applied. For example, a bioactive agent can act to control infection or inflammation, enhance cell growth and tissue regeneration, control tumor growth or kill tumor cells, act as an analgesic, promote anti-cell attachment, and enhance bone growth, among other functions. Some specific though non-limiting examples of bioactive agents include anti-cancer, anti-infective, anti-viral agents, vitamins, hormones, antibodies, steroids, carbohydrates, nucleic-acids, aptamers, peptides, proteins, antibodies, vaccines, or therapeutic compounds (e.g., drugs/pharmaceuticals). Still other bioactive agents include prodrugs, which are agents that are not biologically active when administered but upon administration to a subject are converted to bioactive agents through metabolism or some other mechanism. Bioactive agents can also be veterinary therapeutics and agricultural agents (e.g., pesticides, herbicides, growth promoters, fertilizers). Additionally, any of the compositions disclosed herein can contain combinations of two or more bioactive agents.

The term "residue" as used herein refers to the moiety that is the resulting product of the specified chemical species in a particular reaction scheme or subsequent formulation or chemical product, regardless of whether the moiety is actually obtained from the specified chemical species. For example, a "residue of a monomer chosen from lactide, glycolide, caprolactone, hydroxybutyrate" refers to the moiety which results when a lactide, glycolide, caprolactone, or hydroxybutyrate participates in a particular reaction (e.g., a polymerization reaction). In this case, the lactide, glycolide, caprolactone, or hydroxybutyrate residue is "derived" from these compounds.

The term "secondary component" is used herein to refer to any compound, composition, additive and the like that is associated with or attached to or contained within the polymer particle and may include one or more bioactive agent, pharmaceutical, biomolecule, contrast agent, imaging agent, dye, nutrient, targeting moiety, vaccine, antigen, fluorescent agent, magnetic particle, radioopacity agent, natural polymer (e.g., a protein, a polysaccharide, polypeptide, enzyme, antibody, nucleic acid, etc.), a synthetic polymer (e.g., PEG, PVP, synthetic polypeptide, modified polysaccharide, aptamer, etc.), buffer, surfactant, lipid, osmotic agent, adjuvant and the like.

Reference will now be made in detail to specific aspects of the disclosed materials, compounds, compositions, articles, and methods, examples of which are illustrated in the accompanying Examples and Figures.

Materials and Compositions

Disclosed herein are materials, compounds, compositions, and components that can be used for, can be used in conjunction with, can be used in preparation for, or are products of the disclosed methods, devices, and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components or residues of the composition are discussed, each and every combination and permutation that are possible are specifically contemplated unless specifically indicated to the contrary. Thus, if a class of components or residues A, B, and C are disclosed as well as a class of components or residues D, E, and F, and an example of a combination compound A-D is disclosed, then even if each is not individually recited, each is individually and collectively contemplated. Thus, in this example, each of the combinations A-E, A-F, B-D, B-E, B-F, C-D, C-E, and CF are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Spheronization Processes

Disclosed herein are methods whereby non-spheroid polymer particles are made spheroid by stirring the non-spheroid polymer particles in a heated liquid medium, optionally containing a surfactant and/or other additives. These methods can also be used to reduce the residual monomer level in the polymer material and final product. Further, these methods can also be used with polymer particles that comprise a polymer and one or more secondary components imbedded in the polymer. Such polymer particles blends can comprise a polymer and one or more secondary components such as a bioactive agent, a pharmaceutical, biomolecule, contrast agent, imaging agent, dye, nutrient, targeting moiety, synthetic polymer (e.g., PEG, PVP, polypeptide, modified polysaccharide, polysaccharide, etc.), magnetic particle, radioopacity agent, and the like. The spheroid particles prepared by the processes disclosed herein can also be manipulated in order to modify the surface of the particle. In some specific examples described herein, covalent linking chemistry can be used to add a secondary component to the surface of the polymer particle. Such covalent linking of a secondary component to the polymer particle can be performed before, during, or after the disclosed spheronization processes.

In the disclosed processes, a non-spheroid polymer particle is made spheroid, as defined herein. The disclosed method comprises providing a mixture comprising a non-spheroid polymer particle and a liquid medium; heating the mixture above the glass transition temperature or the melting temperature of the polymer (i.e., the point where the non-spheroid particle becomes spheroid); and cooling the mixture to below the glass transition temperature or melting temperature of the polymer, thereby producing a spheroid polymer particle. The disclosed methods further comprise collecting, washing, and drying the spheroid polymer particle.

Also disclosed are methods whereby a polymer particle having low-residual monomer content is prepared from a polymer particle having high-residual monomer content. The disclosed methods comprise providing a mixture comprising a high-residual-monomer polymer particle having an initial residual monomer content and a liquid medium; heating the mixture above the glass transition temperature or the melting temperature of the polymer; and cooling the mixture to below the glass transition temperature or melting temperature of the polymer, thereby producing the lowresidual-monomer polymer particle with a low residual monomer content that is less than the initial residual monomer content. The low-residual-monomer particles can also be spheronized by these processes. In certain examples, the initial residual monomer content can be reduced by 25%, 30%, 35%, 40%, 45%, 50%, 55%, 60%, 65%, 70%, 75%, 80%, 85%, 85%, or 90%, based on the weight of the polymer particle, by the disclosed methods. As such, disclosed herein are spheroid polymer particle having a low residual monomer content that is from 10 to about 75% of the initial residual monomer content of a non-spheroid polymer particle.

Also disclosed are polymers made by the disclosed processes. For example, disclosed herein are spheroid polymer particles that comprise less residual monomer that the non-spheroid polymer particle from which they are made.

Polymers

The non-spheroid polymers or high-residual monomer polymer that are used in the disclosed methods are generally provided as small particles. Small particles of polymer can be obtained in multiple ways, and the method of obtaining these particles is not critical to the disclosed methods. For example, the polymer particles can be produced by cutting a polymeric rod or fiber into small pieces; in this case the resultant particles can be in the shape of cylinders. The small polymeric particles can also be produced by grinding polymer (grinding beads, pellets, sheets, etc.); in this case the resultant particles will be irregular in shape. Further, the polymer particles can be obtained commercially.

Any polymer or blends of polymers that one desires to spheronize and/or reduce the residual monomer content can be used in the disclosed methods. Particularly suitable examples include but are not limited to, poly(lactide-glycolide) copolymers, lactide homopolymers, glycolide homopolymers, caprolactones, and mixtures thereof. Other suitable polymers comprise polyethylene glycol (PEG), also known as polyethylene oxide (PEO), polypropylene oxide (PPO), and mixtures thereof. Additional examples of polymers can be those based on acrylic acid, such as homopolymers or copolymers of poly(meth)acrylate, polyvinyl alcohol, polyacrylonitrile, polyacrylamides, poly(alkylcyanoacrylates), and the like. Still other examples include polymers based on organic acids such as, but not limited to, polyglucuronic acid, polyaspartic acid, polytartaric acid, polyglutamic acid, polyfumaric acid, including copolymers thereof. Suitable polymers that are based on esters include, but are not limited to, poly(ortho esters), poly(block-ether esters), poly(ester amides), poly(ester urethanes), polyphosphonate esters, polyphosphoesters, polyanhydrides, and polyphosphazenes, including copolymers thereof.

In further examples, the polymer can be a polysaccharide. Still further examples of polymers include, but are not limited to, polyhydroxyalkanoates, poly(propylene fumarate), polyvinylpyrrolidone, polyvinyl polypyrrolidone, polyvinyl N-methylpyrrolidone, polyvinyl alcohol, carboxypolymethylene, polyacrylic acid, poly(hydroxypropyl methacrylate), poly(hydroxyethyl methacrylate), polyacrylamide, polyethylene glycol, starch, cellulose, methylcellulose, aminodextran, dextran, DEAE-dextran, chondroitin sulfate, dermatan, dermatan sulfate, heparan, heparan sulfate, heparin, chitosan, alginic acid, sodium alginate, pectin, carboxymethylcellulose, hydroxypropylcellulose, carboxymethyl amylose, hyaluronic acid, hyaluronan, sodium hyaluronate, potassium hyaluronate, magnesium hyaluronate, calcium hyaluronate, agarose, carrageenan, gelatin, acid-hydrolytically-degraded gelatin, glycogen, polyethyleneimine, polylysine, or any combination of thereof.

As previously noted, the non-spheroid and/or or high-residual-monomer polymer particles can have one or more secondary components imbedded in or covalently linked to the polymer particle. By "imbedded" is meant that the secondary component is wholly or partially encapsulated within the particle. After the disclosed spheronization processes, a majority of the secondary component (e.g., more than 50% of the original amount) can still be present in the resulting spheroid polymer particle. The disclosed polymer particles can also have no active (e.g., a placebo).

Such polymers can be extruded into rods or fibers, or the polymer can be in the form of pellets, beads, or ground bulk polymers or a sheet of polymer, prior to the formation of the spheroid polymer particles.

Secondary Components

In many examples herein, the disclosed polymer particles can have one or more secondary components imbedded in or covalently linked to the particle directly or via a linker. Suitable examples of secondary components include a bioactive agent (e.g., pharmaceutical (drug or vaccine), nutrient, biomolecule), contrast agent, imaging agent, dye, targeting moiety, synthetic polymer, magnetic particle, radioopacity agent, and the like.

When the secondary component is a bioactive agent, it may be a drug or other pharmaceutically-active agent use to treat disease or illness. Any such pharmaceutical can be used as a secondary component, so long as the disclosed spheronization process will not adversely affect (e.g., degrade) the pharmaceutical. Suitable examples of pharmaceuticals can be found in the Merck Index (13th Edition, Wiley, 2001), The United States Pharmacopeia-National Formulary (USP-NF), and the FDA's Orange book, which are each incorporated by reference herein at least for their teachings of pharmaceuticals. Suitable pharmaceuticals are commercially available. It is also contemplated that potential therapeutic agents can be suitable secondary components in the disclosed polymer particles.

In other examples, the secondary component can be a bioactive agent such as a biomolecule. Examples of biomolecules include, but are not limited to, a small molecule, a peptide, a protein, an enzyme (e.g., a kinase, a phosphatase, a methylating agent, a protease, a transcriptase, an endonuclease, a ligase, and the like), an antibody and/or fragment thereof, a nucleic acid (e.g., an oligonucleotide, a prime, a probe, an aptamer, a ribozyme, etc.), a lipid, a carbohydrate, a steroid, a hormone, a vitamin, "Small molecule" as used herein, is meant to refer to a composition, which has a molecular weight of less than about 5 kD, for example, less than about 4 kD. Small molecules can be nucleic acids (e.g., DNA, RNA), peptides, polypeptides, peptidomimetics, carbohydrates, lipids, factors, cofactors, hormones, vitamins, steroids, trace elements, or other organic (carbon containing) or inorganic molecules. Such biomolecules can be obtained commercially or can be synthesized or isolated from natural sources by methods known in the art.

There are a variety of compositions disclosed herein where the secondary component (e.g., biomolecule) can comprise an amino acid based molecule, including for example enzymes and antibodies. Thus, as used herein, "amino acid," means the typically encountered twenty amino acids which make up polypeptides. In addition, it further includes less typical constituents which are both naturally occurring, such as, but not limited to formylmethionine and selenocysteine, analogs of typically found amino acids, and mimetics of amino acids or amino acid functionalities. Non-limiting examples of these and other molecules are discussed herein.

As used herein, the terms "peptide" and "protein" refer to a class of compounds composed of amino acids chemically bound together. Non-limiting examples of these and other molecules are discussed herein. In general, the amino acids are chemically bound together via amide linkages (CONH); however, the amino acids can be bound together by other chemical bonds known in the art. For example, the amino acids can be bound by amine linkages. "Peptide" as used herein includes oligomers of amino acids and small and large peptides, including naturally occurring or engineered polypeptides and proteins. It is understood that the terms "peptide" and "protein" can be used interchangeably herein.

Methods for producing such peptides and proteins are well known. One method of producing the disclosed proteins is to link two or more peptides or polypeptides together by protein chemistry techniques. For example, peptides or polypeptides can be chemically synthesized using currently available laboratory equipment using either Fmoc (9-fluorenylmethyloxycarbonyl) or Boc (tert-butyloxycarbonoyl) chemistry. (Applied Biosystems, Inc., Foster City, Calif.). One skilled in the art can readily appreciate that a peptide or polypeptide corresponding to the disclosed proteins, for example, can be synthesized by standard chemical reactions. For example, a peptide or polypeptide can be synthesized and not cleaved from its synthesis resin whereas the other fragment of a peptide or protein can be synthesized and subsequently cleaved from the resin, thereby exposing a terminal group which is functionally blocked on the other fragment. By peptide condensation reactions, these two fragments can be covalently joined via a peptide bond at their carboxyl and amino termini, respectively, to form an antibody, or fragment thereof. (Grant, Synthetic Peptides: A User Guide. W.H. Freeman and Co., N.Y. 1992; Bodansky and Trost, Ed. Principles of Peptide Synthesis. Springer-Verlag Inc., N.Y., 1993, which are incorporated by reference herein at least for their teachings of peptide synthesis).

In another example, the secondary component can comprise an antibody or fragment thereof. Antibodies or fragments thereof can be considered biomolecules, imaging agents, and/or target moieties, as the terms are used herein. The term "antibody" encompasses, but is not limited to, whole immunoglobulin (i.e., an intact antibody) of any class. Native antibodies are usually heterotetrameric glycoproteins, composed of two identical light (L) chains and two identical heavy (H) chains. Typically, each light chain is linked to a heavy chain by one covalent disulfide bond, while the number of disulfide linkages varies between the heavy chains of different immunoglobulin isotypes. Each heavy and light chain also has regularly spaced intrachain disulfide bridges. Each heavy chain has at one end a variable domain (V(H)) followed by a number of constant domains. Each light chain has a variable domain at one end (V(L)) and a constant domain at its other end; the constant domain of the light chain is aligned with the first constant domain of the heavy chain, and the light chain variable domain is aligned with the variable domain of the heavy chain. Particular amino acid residues are believed to form an interface between the light and heavy chain variable domains. The light chains of antibodies from any vertebrate species can be assigned to one of two clearly distinct types, called kappa and lambda, based on the amino acid sequences of their constant domains. Depending on the amino acid sequence of the constant domain of their heavy chains, immunoglobulins can be assigned to different classes. There are five major classes of human immunoglobulins: IgA, IgD, IgE, IgG and IgM, and several of these may be further divided into subclasses (isotypes), e.g., IgG-1, IgG-2, IgG-3, and IgG-4; IgA-1 and IgA-2. One skilled in the art would recognize the comparable classes for mouse. The heavy chain constant domains that correspond to the different classes of immunoglobulins are called alpha, delta, epsilon, gamma, and mu, respectively.

The term "antibody" as used herein is meant to include intact molecules as well as fragments thereof, such as, for example, Fab and F(ab')2, which are capable of binding the epitopic determinant. The term "antibody" also includes monoclonal and polyclonal antibodies, anti-idiopathic, and humanized antibodies.

As used herein, the term "antibody or fragments thereof" encompasses chimeric antibodies and hybrid antibodies, with dual or multiple antigen or epitope specificities, and fragments, such as F(ab')2, Fab', Fab and the like, including hybrid fragments. Such antibodies and fragments can be made by techniques known in the art (see Harlow and Lane. Antibodies, A Laboratory Manual. Cold Spring Harbor Publications, N.Y., 1988). Such antibodies and fragments thereof can be screened for specificity and activity according to the methods disclosed herein.

Also included within the meaning of "antibody or fragments thereof" are conjugates of antibody fragments and antigen binding proteins (single chain antibodies) as described, for example, in U.S. Pat. No. 4,704,692, the contents of which are hereby incorporated by reference for at least its teaching of antibody conjugates. The fragments, whether attached to other sequences or not, include insertions, deletions, substitutions, or other selected modifications of particular regions or specific amino acids residues. Methods of producing and/or isolating antibodies as disclosed herein are well known.

There are also a variety of compositions disclosed herein where the secondary component can comprise a nucleic acid based molecule. Thus, as used herein, "nucleic acid" means a molecule made up of, for example, nucleotides, nucleotide analogs, or nucleotide substitutes. Non-limiting examples of these and other molecules are discussed herein. A nucleic acid can be double stranded or single stranded. Nucleic acid is also meant to include oliognucleotides.

As used herein, "nucleotide" is a molecule that contains a base moiety, a sugar moiety and a phosphate moiety. Nucleotides can be linked together through their phosphate moieties and sugar moieties creating an internucleoside linkage. The base moiety of a nucleotide can be adenine-9-yl (A), cytosine-1-yl (C), guanine-9-yl (G), uracil-1-yl (U), and thymin-1-yl (T). The sugar moiety of a nucleotide is a ribose or a deoxyribose. The phosphate moiety of a nucleotide is pentavalent phosphate. A non-limiting example of a nucleotide would be 3'-AMP (3'-adenosine monophosphate) or 5'-GMP (5'-guanosine monophosphate).

"Nucleotide analog," as used herein, is a nucleotide which contains some type of modification to either the base, sugar, or phosphate moieties. Modifications to nucleotides are well known in the art and would include for example, 5-methylcytosine (5-me-C), 5-hydroxymethyl cytosine, xanthine, hypoxanthine, and 2-aminoadenine as well as modifications at the sugar or phosphate moieties.

"Nucleotide substitutes," as used herein, are molecules having similar functional properties to nucleotides, but which do not contain a phosphate moiety, such as peptide nucleic acid (PNA). Nucleotide substitutes are molecules that will recognize nucleic acids in a Watson-Crick or Hoogsteen manner, but which are linked together through a moiety other than a phosphate moiety. Nucleotide substitutes are able to conform to a double helix type structure when interacting with the appropriate target nucleic acid.

It is also possible to link other types of molecules to nucleotides or nucleotide analogs to make conjugates that can enhance, for example, cellular uptake. Conjugates can be chemically linked to the nucleotide or nucleotide analogs. Such conjugates include but are not limited to lipid moieties such as a cholesterol moiety (Letsinger et al, *Proc Natl Acad Sci USA*, 1989, 86:6553-6, which is incorporated by reference herein at least for its teachings of nucleic acid conjugates). As used herein, the term nucleic acid includes such conjugates, analogs, and variants of nucleic acids.

Nucleic acids, such as those described herein, can be made using standard chemical synthetic methods or can be produced using enzymatic methods or any other known method. Such methods can range from standard enzymatic digestion followed by nucleotide fragment isolation (see for example, Sambrook et al., Molecular Cloning: A Laboratory Manual, 3d Edition, Cold Spring Harbor Laboratory Press, Cold Spring Harbor, N.Y., 2001, Chapters 5, 6) to purely synthetic methods, for example, by the cyanoethyl phosphoramidite method using a Milligen or Beckman System 1Plus DNA synthesizer (for example, Model 8700 automated synthesizer of Milligen-Biosearch, Burlington, Mass. or ABI Model 380B). Synthetic methods useful for making oligonucleotides are also described by Ikuta et al, *Ann Rev Biochem* 1984, 53:323-56 (phosphotriester and phosphite-triester methods), and Narang et al., *Methods Enzymol* 1980, 65:610-20 (phosphotriester method). Protein nucleic acid molecules can be made using known methods such as those described by Nielsen et al., *Bioconjug Chem* 1994, 5:3-7. (Each of these references is incorporated by reference herein at least for their teachings of nucleic acid synthesis.)

Also, the secondary component can comprise an imaging agent, which is a chemical compound that can produce a detectable signal, either directly or indirectly. Many such imaging agents are known to those of skill in the art. Examples of imaging agents suitable for use in the disclosed compositions and method are radioactive isotopes, fluorescent molecules, phosphorescent molecules, enzymes, antibodies, and ligands. Imaging agents that combine two or more of the moieties disclosed herein are also considered imaging moieties.

Any of the known imaging agents can be used with the disclosed particles and spheronization processes, so long as the imaging agent is not adversely affected by the spheronization processes. Methods for detecting and measuring signals generated by imaging agents are also known to those of skill in the art. For example, radioactive isotopes can be detected by scintillation counting or direct visualization; fluorescent molecules can be detected with fluorescent spectrophotometers; phosphorescent molecules can be detected with a spectrophotometer or directly visualized with a camera; enzymes can be detected by detection or visualization of the product of a reaction catalyzed by the enzyme; antibodies can be detected by detecting a secondary detection label coupled to the antibody.

In one example, the disclosed imaging agents can comprise a fluorescent imaging agent. A fluorescent imaging agent is any chemical moiety that has a detectable fluorescence signal. This imaging agent can be used alone or in combination with other imaging agents. Examples of suitable fluorescent agents that can be used in the compositions and methods disclosed herein include, but are not limited to, fluorescein (FITC), 5-carboxyfluorescein-N-hydroxysuccinimide ester, 5,6-carboxymethyl fluorescein, nitrobenz-2-oxa-1,3-diazol-4-yl (NBD), fluorescamine, OPA, NDA, indocyanine green dye, the cyanine dyes (e.g., Cy3, Cy3.5, Cy5, Cy5.5 and Cy7), 4-acetamido-4'-isothiocyanatostilbene-2,2'disulfonic acid, acridine, acridine isothiocyanate, 5-(2'-aminoethyl)aminonaphthalene-1-sulfonic acid (EDANS), 4-amino-N-[3-vinylsulfonyl)phenyl]naphthalimide-3,5 disulfonate, N-(4-anilino-1-naphthyl)maleimide, anthranilamide, BODIPY, Brilliant Yellow, coumarin, 7-amino-4-methylcoumarin (AMC, Coumarin 120), 7-amino-4-trifluoromethylcoumarin (Coumarani 151), cyanosine, 4',6-diaminidino-2-phenylindole (DAPI), 5',5"-dibromopyrogallol-sulfonaphthalein (Bromopyrogallol Red), 7-diethylamino-3-(4'-isothiocyanatophenyl)-4-methylcoumarin diethylenetriamine pentaacetate, 4,4'-diisothiocyanatodihydro-stilbene-2,2'-disulfonic acid, 4,4'-diisothiocyanatostilbene-2,2'-disulfonic acid, 5-[dimethylamino]naphthalene-1-sulfonyl chloride (DNS, dansylchloride), 4-(4'-dimethylaminophenylazo)benzoic acid (DABCYL), 4-dimethylaminophenylazophenyl-4'-isothiocyanate (DABITC), eosin, eosin isothiocyanate, erythrosin B, erythrosine, isothiocyanate, ethidium bromide, ethidium, 5-carboxyfluorescein (FAM), 5-(4,6-dichlorotriazin-2-yl)aminofluorescein (DTAF), 2',7'-dimethoxy-4'5'-dichloro-6-carboxyfluorescein (JOE), fluorescein isothiocyanate, IR144, IR1446, Malachite Green isothiocyanate, 4-methylumbelliferone, ortho cresolphthalein, nitrotyrosine, pararosaniline, Phenol Red, B-phycoerythrin, o-phthaldialdehyde, pyrene, pyrene butyrate, succinimidyl 1-pyrene butyrate, Reactive Red 4 (Cibacron[R] Brilliant Red 3B-A), 6-carboxy-X-rhodamine (ROX), 6-carboxyrhodamine (R6G), lissaminei rhodamine B sulfonyl chloride rhodamine (Rhod), 5,6-tetramethyl rhodamine, rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, tetramethyl rhodamine isothiocyanate (TRITC), riboflavin, rosolic acid, coumarin-6, and the like, including combinations thereof. These fluorescent imaging moieties can be obtained from a variety of commercial sources, including Molecular Probes, Eugene, Oreg. and Research Organics, Cleveland, Ohio, or can be synthesized by those of ordinary skill in the art.

In another example, the disclosed imaging agents can comprise a Magnetic Resonance Imaging (MRI) agent. A MRI agent is any chemical moiety that has a detectable magnetic resonance signal or that can influence (e.g., increase or shift) the magnetic resonance signal of another agent. This type of imaging agent can be used alone or in combination with other imaging agent. In still another example, a gadolinium-based MRI agent can serve as an imaging agent. An example of a suitable MRI agent that can be incorporated into the disclosed imaging agents is para-amino-benzyl diethylenetriaminepentaacetic acid (p-NH2-Bz-DTPA, Compound 7), a conjugable form of diethylenetriaminepentaacetic acid (DTPA), which is known to strongly bind gadolinium and is approved for clinical use as a magnetic resonance contrast agent. Others have successfully bound similar MRI contrast agents to PAMAM™ (Kobayashi et al., *Bioconjugate Chem* 2001, 12:100-107; Kobayashi et al, *Mag Res in Medicine* 2001, 46:579-85) dendrimers for in vivo small animal imaging; these references are incorporated by reference herein at least for their teachings of MRI agents. Incorporation of an MRI agent on a large macromolecule such as a dendrimeric substrate as disclosed herein can allow large T1 relaxation (high contrast) and multiple copies of agent on a single molecule, which can increase signal. By combining an MRI imaging agent and, for example, a fluorescent imaging agent, the resulting agent can be detected, imaged, and followed in real-time via MRI.

Other imaging agents include PET agents that can be prepared by incorporating an 18F or a chelator for 64Cu or 68Ga. Also, addition of a radionuclide can be used to facilitate SPECT imaging or delivery of a radiation dose.

Other suitable secondary components, which can either be embedded in the particles or covalently attached to the surface of the particles, include polymers, which can be synthetic polymers, natural polymers, or natural polymers that have been further chemically modified. Non-limiting examples of synthetic polymers include, but are not limited to, poly(ethylene glycol) (PEG), poly(ethylene oxide) (PEO), copolymers of PEG and PEO (such as Pluronics), polyvinyl pyrrolidone (PVP). Natural polymers and chemically-modified natural polymers include, but are not limited to, biopolymers, peptides, proteins, nucleic acids, and polysaccharides. Non-limiting examples of proteins include, but are not limited to, albumin, bovine serum albumin, human serum albumin, horseradish peroxidase, apolipoprotein E, keratin, elastin, actin, myosin, gelatin, collagen, enzymes, antibodies and the like. Non-limiting examples of polysaccharides include, but are not limited to, dextran, chitin, chitosan, starch, glycogen, cellulose, dextrin, maltodextrin, hyaluronic acid and the like.

The disclosed particles can have one secondary component or two or more secondary components either in the particle or covalently attached to the surface of the particle or both. The secondary component of the disclosed particles can be covalently attached directly to the surface of the particle or it can be attached to the surface of the particle through a linker or linking chemistry. The linker may be non-polymeric or it may be oligomeric or polymeric in chain length.

In several examples, the disclosed secondary components can be linked to a polymer particle via a biosensitive linker that is an enzyme cleavable peptide. The resulting polymer can be used for targeted delivery or imaging of sites where a particular enzymatic activity is increased.

In further examples, the secondary components can also comprise a targeting moiety. For example, a targeting moiety (e.g., antibody or fragment thereof, as described herein) can be attached to the polymer directly or via a linker or via a biosensitive linker. The targeting moiety can act to deliver or localize the polymer particle to a particular area of a subject. Non-limiting examples of targeting agents or moieties can include folate-binding agents, biotin, albumin, peptides, proteins, polysaccharides, RGD peptides, glycosylated targeting ligands, lipoproteins, antibodies, antibody fragments, enzymes, nucleic acids, aptamers, tumor-specific ligands or peptides, receptor-specific ligands or peptides, and so on.

In alternative examples, the secondary component can be an indicator (e.g., pH), a carbon based nanostructure (e.g., buckyball and nanotube), a dendrimer, a nanoscale device, a microelectric machine (MEMs), an organic or inorganic compound (e.g., iron oxide), a non-water liquid, a gas (e.g., hydrogen), and mixtures thereof.

Liquid Medium

In the disclosed methods, the non-spheroid and/or high-residual-monomer polymer particles are placed in a liquid medium to form a mixture. The resulting mixture (which can also be called a suspension, depending on the size of the particles and the medium) is then heated above the polymer glass transition temperature (Tg) (if a non-crystalline polymer) or melting point (if a crystalline polymer) of the polymer so they particles partially or completely melt, forming "droplets" in the medium. Upon cooling to below the Tg or melting point of the polymer, the "droplets" harden into "spheroid" microparticles. The now spheroid polymer particles can then be collected, washed, and dried.

The disclosed methods do not use an emulsion/solvent extraction method, whereby the solvent is used to dissolve the polymer. That is, the liquid medium used can be any medium that preferably does not dissolve the polymer or at least that the polymer particles are partially insoluble in. The particular liquid medium used will thus depend on the polymer used, the type of secondary component (if any), preference, whether a plasticizing agent is used, and the like.

Examples of suitable liquid media include, but are not limited to, dimethyl sulfoxide, dimethyl formamide, acetamide, hexamethyl phosphoramide, ethanol, methanol, 1- or 2-propanol, tert-butanol, acetone, methyl ethyl ketone, acetaldehyde, propionaldehyde, ethylene glycol, propylene glycol, $C_{1-4}$ alkyl and alkoxy ethylene glycols and propylene glycols such as 2-methoxyethanol, 2-ethoxyethanol, 2-butoxyethanol, diethyleneglycol, alkanes such as pentane, hexane, cyclohexane, heptane, octane, nonane, and decane, methylene chloride, chloroform, and mixtures thereof. Particularly, suitable examples of liquid media include, but are not limited to, water and aqueous systems containing a small amount of surfactant (e.g., about 1% polyvinyl alcohol).

In certain examples, plasticizers can be added to the polymers prior to or during the disclosed spheronization process in order to conduct the process at lower temperatures and/or for shorter times than would be needed without the plasticizers. That is the use of a plasticizer can reduce the Tg or melting point of a polymer and thus the temperature or time needed to spheronize the particles can be reduced. Plasticization of the polymer particles can be done by contacting a plasticizing agent to the outer portion of the polymer particle before the particle is placed in the liquid medium or while the particle is in the liquid medium. Alternatively, the plasticizing agent can be contacted throughout the entire polymer particle. In one specific example, the particle is contacted with a plasticizing solvent by treating with solvent vapor or by placing the particles directly into the plasticizing solvent liquid or into solutions that contain a plasticizing agent. Suitable examples of plasticizing solvents are ethyl acetate, acetone, butanone, ethyl alcohol, isopropyl alcohol, methyl alcohol, butyl alcohol, benzyl alcohol, N-methylpyrrolidone, methylene chloride, DMF, and the like. Suitable examples of plasticizing agents include, but are not limited to, diethyl phthalate, glycerol triacetate, acetylated monoglycerides, acetyltributylcitrate, acetyltriethyl citrate, castor oil, citric acid esters, dibutyl phthalate, dibutyl sebacate, diethyloxalate, diethyl malate, diethylfumarate, diethylphthalate, diethylsuccinate, diethylmalonate, diethyltartrate, dimethylphthalate, glycerin, glycerol, glyceryl triacetate, glyceryltributyrate, mineral oil and lanolin alcohols, petrolatum and lanolin alcohols, phthalic acid esters, polyethylene glycols, propylene glycol, rape oil, sesame oil, triacetin, tributyl citrate, triethyl citrate, and triethyl acetyl citrate, or a mixture of any two or more of the foregoing. Plasticizers which can be used for aqueous coatings include, for example, propylene glycol, polyethylene glycol (PEG 400), triacetin, polysorbate 80, triethyl citrate, diethyl d-tartrate.

Surfactants

In many examples, an aqueous liquid medium can comprise a surfactant. A "surfactant" as used herein is a molecule composed of hydrophilic and hydrophobic groups (i.e., an amphiphile). The surfactant can be an ionic or nonionic surfactant. For example, the liquid medium can comprise an anionic surfactant. Any anionic surfactants can be used. Suitable anionic surfactants are commonly used in detergents, shampoos, soaps, etc., and can be obtained commercially or prepared by methods known in the art. They include, but are not limited to, alkylbenzene sulfonates (detergent), fatty acid based surfactants, lauryl sulfate (e.g., a foaming agent), di-alkyl sulfosuccinate (e.g., a wetting agent), lignosulfonates (e.g., a dispersant), and the like, including mixtures thereof. In other examples, linear alkylbenzene sulphonic acid, sodium lauryl ether sulphate, alpha olefin sulphonates, phosphate esters, sodium sulphosuccinates, hydrotropes, and the like, including mixtures thereof, can be used.

In other examples, an aqueous liquid medium can comprise a cationic surfactant. Any cationic surfactant can be used. Suitable cationic surfactants included, bur are not limited to, quaternary ammonium compounds, imidazolines, betaines, etc. Such cationic surfactants can be obtained commercially or can be prepared by methods known in the art.

In still other examples, an aqueous liquid medium can comprise a nonionic surfactant. Any nonionic surfactant can be used. Suitable nonionic surfactants do not ionize in aqueous solution, because their hydrophilic group is of a non-dissociable type, such as alcohol, phenol, ether, ester, or amide. They can be classified as ethers (e.g., polyhydric alcohols such as glycerin, solbitole, sucrose, etc.), fatty acid esters (e.g., glycerin fatty acid ester, sobitan fatty acid ester, sucrose fatty acid ester, etc.), esters (e.g., compounds made by applying, for example, ethylene oxide to a material having hydroxyl radicals such as high alcohol, alkyl-phenol, and the like), ether/esters (e.g., compounds made by applying, for example, the ethylene oxide to the fatty acid or polyhydric alcohol fatty acid ester, having both ester bond and ether bond in the molecule), and other types (e.g., the fatty acid alkanol-amide type or the alkylpolyglyceride type). A particularly suitable nonionic surfactant is poly (vinyl alcohol). Other suitable examples of nonionic surfactants can include, but are not limited to, alcohol ethoxylates and alkyl phenol ethyoxylates, fatty amine oxides, alkanolamides, ethylene oxide/propylene oxide block copolymers, alkyl amine ethoxylates, tigercol lubricants, etc.

In yet other examples, aqueous liquid medium can comprise dipolar surfactants. Any dipolar surfactant can be used. Suitable dipolar surfactants (called amphoteric or zwitterionic) exhibit both anionic and cationic dissociation. Suitable examples of dipolar surfactants include, but are not limited to, products like betaines or sulfobetaines and natural substances such as amino acids and phospholipids. In one aspect, the betaines disclosed in U.S. Pat. Nos. 6,852,816; 6,846,795; 6,846,352; and 6,849,426, which are incorporated by reference in their entireties, can be used herein.

Other examples of suitable surfactants include natural surfactants, which can have their source from plant or animal organs. In another example, a boloform surfactant can be used. A boloform surfactant is a surfactant that has two hydrophilic head groups at opposite ends of a hydrophobic tail.

Mixtures of these surfactants can also be used in the compositions and methods disclosed herein.

Additives

The liquid medium can also contain other additives or excipients. For example, the liquid medium can contain pH buffers, organic acids (e.g., formic, acetic, propionic, benzoic, maleic, oxalic acids, and the like), mineral acids (e.g., HCl, HBr, $H_2SO_4$, $H_3PO_4$, and the like), bases (e.g., NaOH, KOH, $Et_3N$, $Na_2CO_3$, $NaHCO_3$, $KHCO_3$, and the like), preservatives, dyes, antioxidants (e.g., tocopherols), wetting, emulsifying, suspending agents, flocculating, and dispensing agents. The liquid medium can also contain bioactive agents. For example, the bioactive agent in the polymer blend can be added to the liquid medium (at concentration levels up to and including saturation level in the liquid medium) in order to reduce the amount of drug that is extracted from the polymer blend during the processing. In other examples, the liquid medium can contain other additives for preventing the action of microorganisms. This can be accomplished by various antimicrobial and/or antifungal agents, for example, parabens, chlorobutanol, phenol, sorbic acid, quaternary ammonium compounds, and the like. It may also be desirable to include surfactants, binders, as for example, carboxymethylcellulose, alignates, gelatin, polyvinylpyrrolidone, sucrose, and acacia, humectants, as for example, glycerol, wetting agents, as for example, cetyl alcohol and glycerol monostearate, adsorbents, as for example, kaolin and bentonite, and lubricants, as for example, talc, calcium stearate, magnesium stearate, solid polyethylene glycols, sodium lauryl sulfate, or mixtures thereof. Suitable flocculating agents that can be used include, but are not limited to, aluminum salts (e.g., aluminium sulphate), ferrous salts, and ferric salts (e.g., ferric sulphate and ferric chloride). Suitable suspending agents can include, for example, ethoxylated isostearyl alcohols, polyoxyethylene sorbitol and sorbitan esters, microcrystalline cellulose, aluminum metahydroxide, bentonite, agar-agar and tragacanth, or mixtures of these substances, and the like. The liquid medium can also comprise solubilizing agents and emulsifiers, as for example, ethyl alcohol, isopropyl alcohol, ethyl carbonate, ethyl acetate, benzyl alcohol, benzyl alcohol, benzyl benzoate, propyleneglycol, 1,3-butyleneglycol, dimethylformamide, oils, in particular, cottonseed oil, groundnut oil, corn germ oil, olive oil, castor oil and sesame oil, glycerol, tetrahydrofurfuryl alcohol, polyethyleneglycols and fatty acid esters of sorbitan or mixtures of these substances, and the like. Additives that can further affect covalent coupling of the secondary component or other chemistry to the polymer particles. Such agents are generally known and are commercially available.

Temperature and Stirring

Heating the mixture of the non-spheroid polymer particles and the liquid medium can be accomplished by any heating technique known in the art. The temperature to which the mixture is heated will depend on the type of the polymer and the type of the liquid medium. Generally, the mixture is heated to a temperature above the glass transition temperature or melting temperature of the polymer.

The mixture of the non-spheroid polymer particles and the liquid medium can also be mixed. Mixing can be accomplished by any conventional procedure in the art, including, but not limited to, various stirring mechanisms (e.g., mechanical and magnetic stirrers), agitation mechanisms (e.g., shakers, tumblers, bubbling gas through the medium), sonication, and vortexing.

Sizes

The disclosed methods can allow for larger polymer particles to be made, especially those not stable in an emulsion/extraction process, for example, particles greater than 1 mm. Particles less than 1 mm, for instance 100 µm in diameter, can be made as well. The size of the particles produced by the method is related to the size of the non-spheroid polymer particles used. Typically, pieces cut to dimensions (l×w×h) of about 40 µm³ to 1 mm³ are used and produce spheroid polymer particles of roughly the same size. In some specific examples, the spheroid polymer prepared by the methods disclosed herein have a diameter of from about 1 µm to about 1 mm, from about 50 µm to about 500 µm, from about 100 µm to about 300 µm, from about 500 µm to about 1000 µm, from about 1 µm to about 100 µm, from about 90 µm to about 300 µm or from about 90 µm to about 180 µm. In some specific examples, the spheroid polymers can have a diameter of about 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, 1000 µm, where any of the stated values can form an upper or lower endpoint of a range. Since the disclose spheroid particles are often not perfectly spherical, the term "diameter" as used herein is meant the longest straight line distance from one side of the particle to the other.

Linking

It can be desired that the surface of the spheroid polymer be functionalized with one or more secondary components, as described herein. Surface functionalization can be accomplished by covalently linking a secondary component to the spheroid particle. Covalent linking can be achieved by a 3+2 cycloaddition reaction between a reactive moiety on the spheroid polymer and on the secondary component. For example, the spheroid polymer can contain a diene moiety and the secondary component can contain a dieneophile. Alternatively, the spheroid polymer can contain a dieneophile and the secondary component can contain a diene. Covalent linking can be achieved by a 2+2 cycloaddition reaction between a reactive moiety on the spheroid polymer and on the secondary component.

Covalent linking can also involve linking a secondary component to the spheroid polymer particles through an ether, imidate, thioimidate, ester, amide, thioether, thioester, thioamide, carbamate, disulfide, hydrazide, hydrazone, oxime ether, oxime ester, and/or amine linkage. Such linkages can be formed from known covalent coupling chemistries as amine-reactive chemistries, thiol-reactive chemistries, carboxylate-reactive chemistries, hydroxyl-reactive chemistries, aldehyde- and ketone-reactive chemistries, active hydrogen-reactive chemistries, photoreactive chemical reactions, redox-based chemistries, and the like. In one example, if the secondary component or the polymer particle has an amino group and the other has a carboxylate group, they can be covalently linked via a peptide bond. This can typically be accomplished by using an activating agent to mediate the coupling. Various activating agents that can be used for the coupling reaction include, but are not limited to, 1-ethyl-3-(3-dimethylaminopropyl)carbodiimide (EDC), dicyclohexylcarbodiimide (DCC), N,N'-diisopropyl-carbodiimide (DIP), benzotriazol-1-yl-oxy-tris-(dimethylamino) phosphonium hexa-fluorophosphate (BOP), hydroxybenzotriazole (HOBt), and N-methylmorpholine (NMM), including a mixture thereof. The coupling reaction can be carried out in N-methylpyrrolidone (NMP) or in DMF. In another example, the coupling reaction can involve the treatment of the sulfonamide with a protected hydroxylamine in the presence of EDC, HOBt, and NMM in DMF. See Tamura et al., *J Med Chem* 1998, 41, 640-649, which is incorporated by reference herein for its teaching of amine-acid coupling reactions.

Other conjugation techniques are disclosed in Greg T. Hermanson, "Bioconjugate Techniques", Academic Press (Elsevier), 1996, which is incorporated by reference herein for its teaching of conjugation techniques.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of conditions, e.g., component concentrations, desired solvents, solvent mixtures, temperatures, pressures and other reaction ranges and conditions that can be used to optimize the methods described herein. Only reasonable and routine experimentation will be required to optimize such process conditions.

Example 1: Grinding (Milling) Procedure

Grinding of polymer particles was performed using a Retsch Mill ZM 100 (Retsch; Düsseldorf, Germany). A 0.5 mm screen and 24-tooth rotor were used for grinding of polymer particles.

The polymer used was Lakeshore polymer, 75-25 acid, from Lakeshore Biomaterials (Birmingham, Ala.). The polymer was chilled first in liquid nitrogen for 10 minutes before grinding. The Retsch Mill was also pre-chilled using liquid nitrogen. The frozen polymer was then continuously added to the Retsch Mill and ground using a mill speed of 18,000 rpm.

Example 2: Sieving Procedure

Polymer product from the milling operation in Example 1 was then sieved, as-is, by hand. The polymer product was placed on top of a 300 µm, 4-inch (10.2 cm) diameter screen. A 90 µm, 4-inch (10.2 cm) diameter screen was affixed below the 300 µm screen. A cover was placed on top of the 300 µm screen. The assembly was then shaken by hand to segregate particles by size. The material that was collected on top of the 90 µm screen represented the particle size fraction of the milled polymer having a size range of from about 90 to 300 µm.

Next, this milled and sieved polymer powder was dried in a vacuum oven. It was placed inside a vacuum oven at room temperature. A vacuum was pulled over the material (about 25 µm Hg) overnight (about 16 hours). The sieved polymer, then, having a particle size range of about 90-300 µm is what was used for further investigations (FIG. 1).

Example 3: Extrusion Using a Tinius-Olsen Plastometer

Extruded polymer bulk extrudate was prepared using a Tinius-Olsen Plastometer fitted with a 1.5 mm diameter extrusion die and a set-temperature of 100° C. Starting polymer (Boehinger Ingleheim 75:25 DL-PLG, from Boehinger Ingleheim) was used as feed stock for extrusion using the Tinius-Olsen Plastometer.

Figure 3:
FIG. 3 is a SEM photomicrograph of the extruded polymer 75:25 DL-PLG (Boehringer Ingleheim) prepared using the Tinius-Olsen Plastometer as described in Example 3 prior to spheronization treatment (scale represents 0.5 mm).
Figure 4:
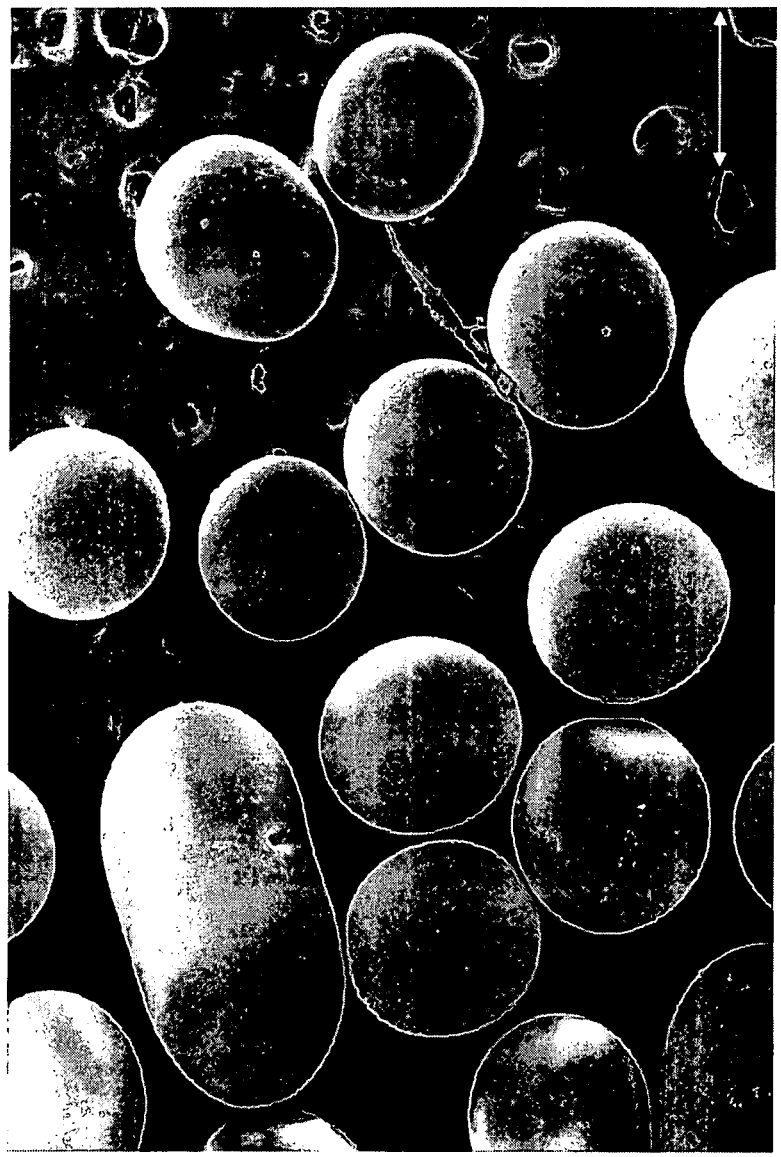
FIG. 4 is a SEM photomicrograph of the extruded polymer 75:25 DL-PLG (Boehringer Ingleheim) prepared using the Tinius-Olsen Plastometer as described in Example 3 after spheronization treatment as described in Example 4 (scale represents 0.5 mm).

The extrusion die was first closed using a plug. About 5 grams of polymer was added to the pre-heated barrel of the Tinius-Olsen Plastometer. The Plastometer plunger was inserted in the barrel and a 10-kg weight was placed on the plunger to compress the polymer powder down to the bottom of the Plastometer. This was maintained for about 5 minutes in order to thermally equilibrate and compress the drug-polymer powder to the bottom of the Plastometer barrel. After the 5-minute equilibration time, the plug on the extrusion die was removed and the polymer was extruded from the Plastometer in the form of a solid, cylindrical tube (the extrudate). The extrudate was cut into short cylindrical pieces about 1-2 mm in length using a razor blade. See FIG. 3. These cut cylindrical extrudate, then, was used in the spheronization process described below.

Figure 5:
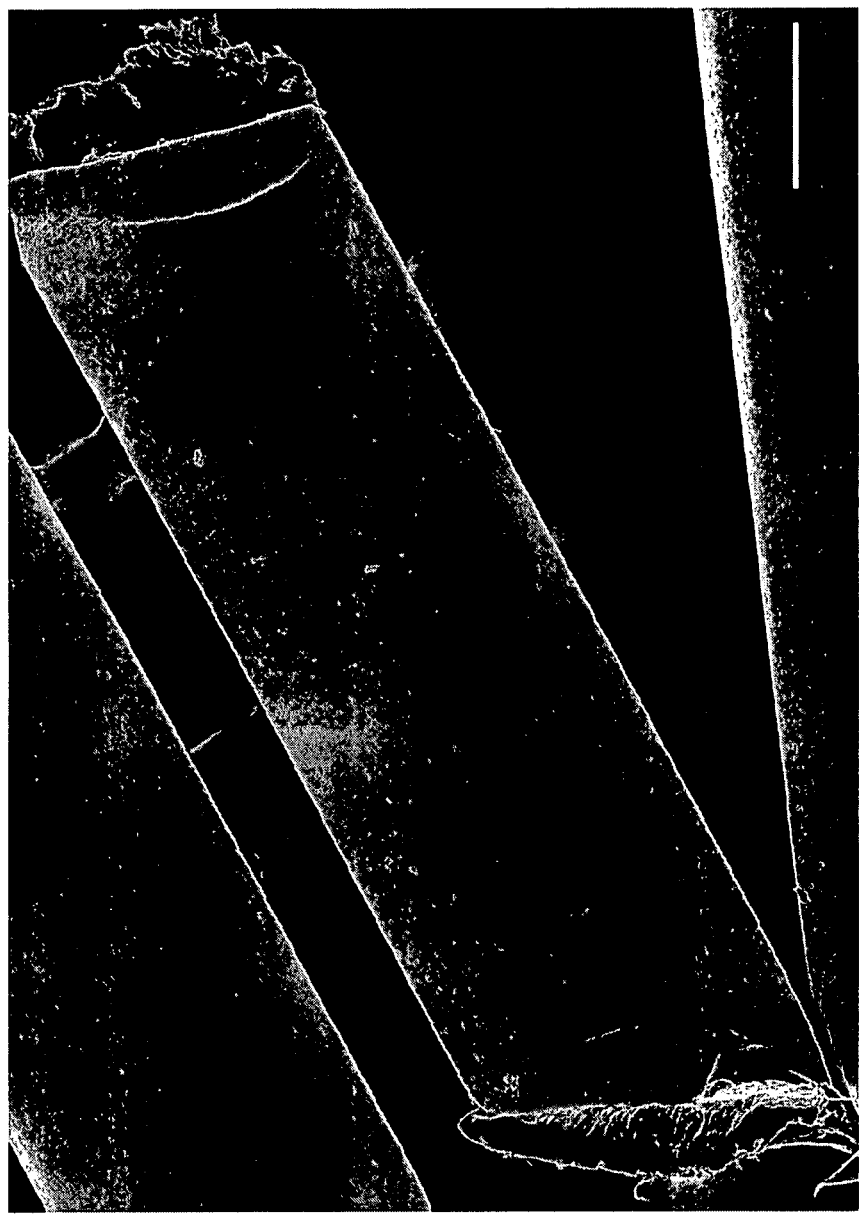
FIG. 5 is a SEM photomicrograph of the extruded polymer polycaprolactone (PCL), a 100 CL 12E from Lakeshore Biomaterials (Birmingham, Ala.), prepared using the Tinius-Olsen Plastometer as described in Example 3 prior to spheronization treatment (scale represents 0.25 mm).
Figure 6:
FIG. 6 is a SEM photomicrograph of the extruded polymer polycaprolactone (PCL), a 100 CL 12E from Lakeshore Biomaterials (Birmingham, Ala.), prepared using the Tinius-Olsen Plastometer as described in Example 3 after spheronization treatment as described in Example 4 (scale represents 0.25 mm).
Figure 7:
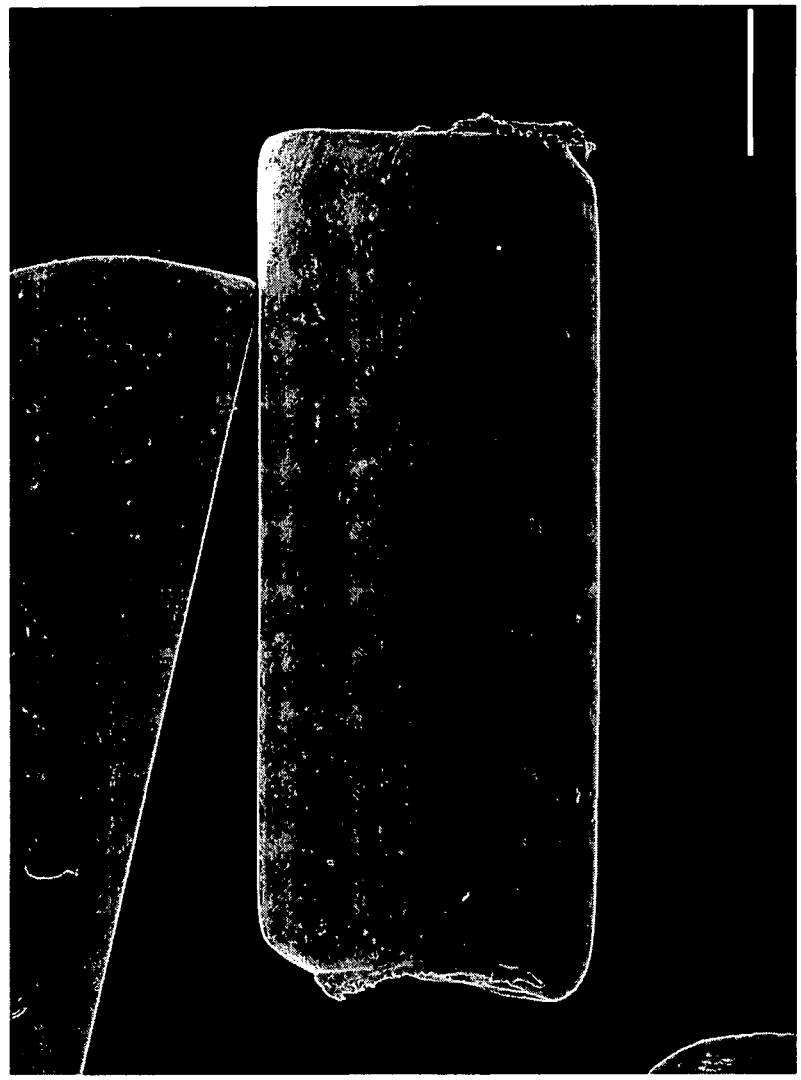
FIG. 7 is a SEM photomicrograph of the extruded polymer EVA prepared using the Tinius-Olsen Plastometer as described in Example 3 prior to spheronization treatment (scale represents 0.5 mm).
Figure 8:
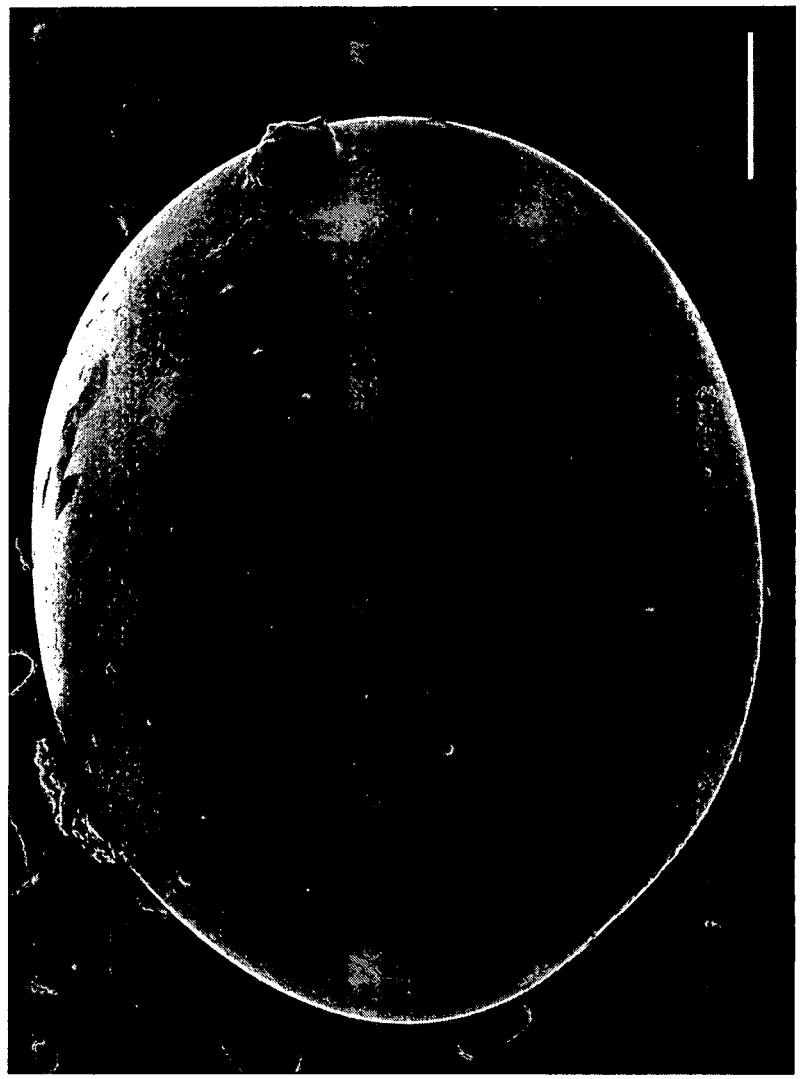
FIG. 8 is a SEM photomicrograph of the extruded polymer EVA prepared using the Tinius-Olsen Plastometer as described in Example 3 after spheronization treatment as described in Example 4 (scale represents 0.25 mm).

Additional polymers and polymer blends were extruded using the Plastometer. For example, polycaprolactone (PCL) (FIG. 5) and Ultrathene ethylenevinyl acetate (EVA) (FIG. 7) (Sigma-Aldrich Chemicals; St. Louis, Mo.) were extruded using the Plastometer along with other samples as described elsewhere.

Example 4: Spheronization Process

About 1 to 1.5 grams of a polymer sample (such as either the cut polymer extrudate from Example 3 or the sieved polymer powder from Example 2) was weighed into a 250-mL beaker. To this was added about 100 grams of an aqueous solution consisting of 2 wt % PVA (polyvinyl alcohol). The beaker and its contents were placed on a heating stir plate (Corning Model PC-320; Corning Inc., Corning N.Y.). An over-head stir motor was set up with a small Teflon turbine impeller. The suspension or slurry was stirred at a stir speed of about 1000 rpm with no heat. After 5 minutes, the beaker was heated using the stir plate. The temperature of the contents was monitored and heating continued until the contents reached a temperature of 90° C. Once this temperature was reached, the contents were stirred for a prescribed time (for example, 1 hour, 2 hours, or 3 hours). After the designed stirring time (treatment time), the hot plate was turned off and then about 100 mL of de-ionized (DI) water (at room temperature) was added to the beaker and the suspension was stirred until the temperature dropped to below 50° C. The contents were then poured across a 150-µm sieve and a 90-µm sieve (stacked on top of one another). The material that was collected on top of the 90-µm screen was then rinsed thoroughly with room temperature DI water and was then placed in a laminar flow hood for approximately 16 hours for the entire polymer to dry. In cases where treatment was being performed on the cut extrudate materials, the product was collected on top of a 150-µm sieve (instead of the 90-µm sieve). See FIGS. 2, 4, 6, and 8.

Example 5: Additives or Plasticizers

Figure 10:
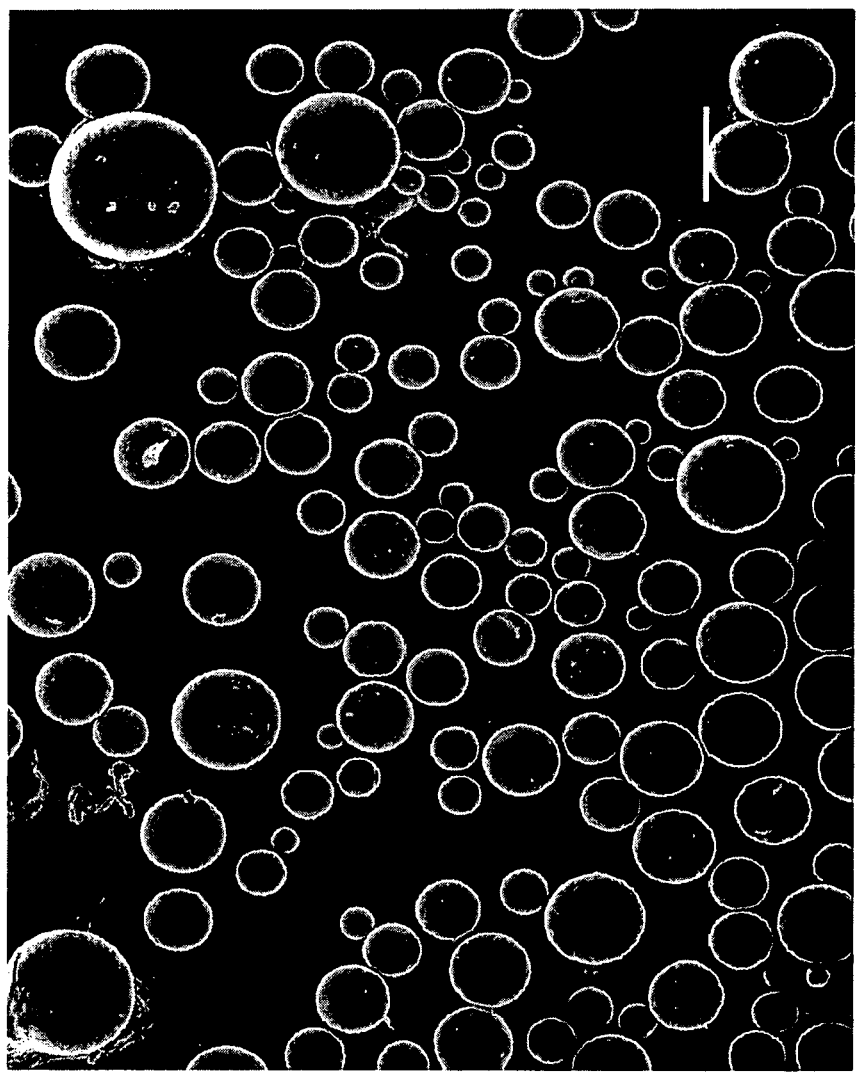
FIG. 10 is a SEM photomicrograph of polymer particles of a poly(DL-lactide) (DL-PL) polymer that were first plasticized using ethyl acetate (as described in Example 5) and were then treated to the spheronization process at 40° C. as described in Example 4. Note that the plasticized polymer particles became more regular in shape following the treatment at 40° C. in contrast to the particles shown in FIG. 9 (scale represents 0.25 mm).

Polymer was milled according to Example 1. A DL-PL polymer (Birmingham Polymers Inc, Birmingham Ala.) was used. After milling, the polymer was sieved according to Example 2. Then approximately 2 grams of sieved polymer was placed on a 90-µm 4-inch (10.2 cm) diameter screen. The sieve was set on a 250 mL beaker containing 50 grams of ethyl acetate. The sieve containing the polymer was kept atop the beaker containing ethyl acetate for 1 hour. After one hour the sieve was removed. The contents of the sieve were transferred to a 250 mL containing 100 grams of 2 wt % PVA. The suspended polymer was treated as described in Example 4 except that treatment temperature employed was 40° C. instead of 90° C. The treatment time was 1 hour. See FIG. 10.

Figure 9:
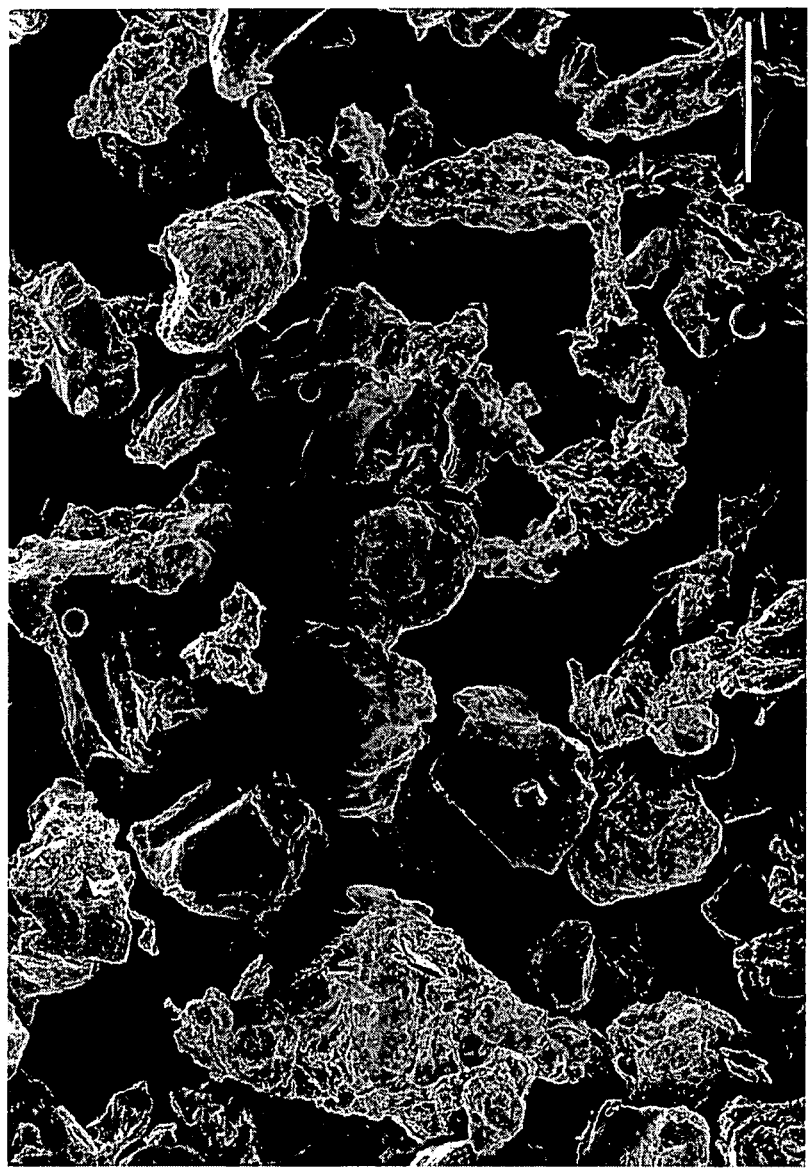
FIG. 9 is a SEM photomicrograph of polymer particles of a poly(DL-lactide) (DL-PL) polymer from Birmingham Polymers (Birmingham, Ala.) that were not exposed to ethyl acetate and were treated to the spheronization process at 40° C. as described in Example 4. Note that after treatment at 40° C., the polymer particles were irregular and non-spheroid (scale represents 0.25 mm).

Another sample of polymer was sieved according to Example 2 and then treated the same way as above except no treatment with ethyl acetate was performed. The treatment temperature was 40° C. See FIG. 9.

Differential Scanning Calorimetry analysis (DSC) was utilized to determine the glass transition temperature (Tg) of the polymer particle samples. DSC was conducted using a TA Instruments 2920 (Newcastle, Del.) on a 5-10 mg sample using a heat rate of 10° C./min. The polymer sample that was not plasticized using ethyl acetate was found to have a glass transition temperature of 46° C. The polymer sample that was plasticized with ethyl acetate was found to have a glass transition temperature of 26° C.

Example 6: Conjugation Procedure

A 100 mM solution of EDC (1-ethyl-3-[3-dimethylaminopropyl]carbodiimide from Pierce Chemicals, Pierce Biotechnology Inc., Rockford Ill.) was prepared in 0.1 M MES buffer (morpholineethanesulfonic acid buffer). Next, 250 mg of spheronized particles from Example 4 were weighed into a 20-mL scincilation vial to which was then added 10 mL of EDC solution. The vial was placed on a platform shaker and the contents were shaken for 2 hours. After two hours, 10 mg of either BSA (bovine serum albumin) or HRP (horseradish peroxidase) (from Sigma Chemical Co.; St. Louis, Mo.) was added and contents were shaken for another two hours.

The vial was placed in a refrigerator for approximately 16 hours (overnight). The next morning, the vial and contents were poured over a 25-µm test sieve. The collected particles were washed with copious amounts of water and phosphate-buffered saline (PBS). The collected particles were then allowed to dry in a laminar flow hood. Control samples (with and without protein or EDC) were prepared as listed.

Example 7: Protein Assay for Conjugated Particles

A Pierce BCA protein assay kit (from Pierce Biotechnology Inc.; Rockford Ill.) was employed to analyze both Control and Test samples from Example 6 for protein content. Samples were analyzed by UV-Vis at 590 nm. About 20-30 milligrams of the material was accurately weighed into a test tube and 2 mL of 1 N NaOH was added. The test tube contents were allowed to dissolve over approximately 18 hours.

At this time, 2 mL of PBS, pH 7.4, was added and the pH was adjusted to pH 7 using phosphoric acid. The contents were then analytically transferred to a 10-mL volumetric flask, which was then diluted to volume with PBS. Protein analysis was then carried out according to the instructions of the Pierce BCA protein assay kit. Standards were prepared from either BSA or HRP respectively. Assay controls were prepared using the equivalent quantities of material as was used in the appropriate chemical steps. In preparation for analysis, these Control samples were then treated to the same sample preparation steps as were used to treat the Test samples. The data are shown in Table 1.

TABLE 1

Protein analysis of protein-conjugated microparticle samples

| Conjugate | | Sample Description | Conjugate content on particles |
|---|---|---|---|
| BSA | Control | Buffer only | nd |
| | Control | Buffer + Particles | nd |
| | Control | Buffer + Particles + EDC coupling agent | nd |
| | Control | Buffer + Particles + BSA (no coupling agent) | 0.08 wt % |
| | Test sample | Buffer + Particles + BSA + EDC | 0.19 wt % |
| HRP | Control | Buffer only | nd |
| | Control | Buffer + Particles | nd |
| | Control | Buffer + Particles + EDC coupling agent | nd |
| | Control | Buffer + Particles + HRP (no coupling agent) | 0.10 wt % |
| | Test sample | Buffer + Particles + HRP + EDC | 0.20 wt % | nd = none detected

Example 8: Conjugation Procedure with Prior Base Treatment of Particles

A 250 mg sample of spheronized particles from Example 4 was weighed into a 20-mL scintillation vial. Next, 10 mL 1 N NaOH solution was added to the vial. The vial was placed on a platform shaker and the contents were shaken for 30 minutes. After 30 minutes the particles were allowed to settle and solution removed using a pipette leaving the particles behind. Then, 10 mL of water was added and vial contents were mixed using a vortex mixer. After particles were allowed to settle, the solution was removed using a pipette leaving the particles. The above process was repeated once more.

Next, 10 mL of EDC solution was added to the vial. The vial was placed on a platform shaker and the contents were shaken for 2 hours. After two hours, 10 mg of BSA (Sigma Chemical Co.; St. Louis, Mo.) was added and contents were shaken for another two hours. Also, the BSA containing sample described in Example 6 was repeated as a control. The protein assay for the samples was the same as listed in Example 7. For comparison purposes, BSA conjugation was also performed using polymer particles that were not pretreated with the sodium hydroxide solution (control sample). The results from analysis of the conjugated control and test samples from this Example are provided in Table 2.

TABLE 2

Protein analysis of protein-conjugated microparticle samples

| Sample | Treatment conditions | BSA content, wt % |
|---|---|---|
| Control | Buffer only | nd |
| | Buffer + Particles | nd |
| | Buffer + Particles + EDC coupling agent | nd |
| | Buffer + Particles + BSA (no coupling agent) | 0.12 wt % |
| | Buffer + Particles + BSA + EDC | 0.22 wt % |

TABLE 2-continued

Protein analysis of protein-conjugated microparticle samples

| Sample | Treatment conditions | BSA content, wt % |
|---|---|---|
| Test A (base treated) | Buffer only | nd |
| | Buffer + Particles | nd |
| | Buffer + Particles + EDC coupling agent | nd |
| | Buffer + Particles + BSA (no coupling agent) | 0.11 wt % |
| | Buffer + Particles + BSA + EDC | 0.19 wt % | nd = none detected
[a]The polymer particles used in these samples were pretreated with 1N sodium hydroxide prior to the conjugation procedure as described in Example 8.

Example 9: Surface Conjugation Involving a Polyethylene Glycol-$NH_2$ (PEG-$NH_2$) Polymer to the Surface of Spheronized Polymer Particles Conjugation of PEG-$NH_2$ to the Surface of Spheronized Polymer Particles A 100 mM solution of EDC (Pierce Chemicals, Pierce Biotechnology Inc., Rockford Ill.) was prepared in MES buffer. Next, 250 mg of spheronized particles from Example 4 were weighed into a 20-mL scintillation vial to which was then added 10 mL of EDC solution. The vial was placed on a platform shaker and the contents were shaken for two hours. After two hours, 10 mg of amine-terminated polyethylene glycol (PEG-NH2, molecular weight 5,000 daltons) (LaysanBio, Inc.; Arab, Ala.) was added and contents were shaken for another two hours.

The vial was placed in a refrigerator for approximately 16 hours (overnight). The next morning, the vial and contents were poured over a 25-μm test sieve. The collected particles were washed with copious amounts of water and PBS. The collected particles were then allowed to dry by evaporation at room temperature in a laminar flow hood. Control samples (with and without PEG-$NH_2$ or EDC) were prepared as listed.

Determination of PEG-$NH_2$ in Conjugated Microsphere Samples

The PEG-$NH_2$ content of conjugated microsphere samples was determined by NMR analysis. PEG-$NH_2$ was dissolved in deuterated chloroform and analyzed by NMR. A singlet peak was identified for the compound at 3.6 ppm. A sample of 75:25 DL-PLG 6A (Lakeshore Biomaterials, Birmingham Ala.) was dissolved in deuterated chloroform and analyzed by NMR. No peaks were identified at 3.6 ppm for the Control polymer sample that did not contain the PEG-$NH_2$. As a single-point Standard, a 100-mg sample was prepared of PEG-$NH_2$ and the 75:25 DL-PLG at a PEG-$NH_2$ concentration of 0.4 wt %. This Standard sample was dissolved in deuterated chloroform and analyzed by NMR. The peak-height for the 3.6 ppm shift of the Standard sample was determined and was used as a single-point standard to estimate the PEG-content of the test and control samples. A 100-mg test sample of the PEG-conjugated microspheres was prepared in similar fashion to the control sample by dissolving into deuterated chloroform (along with various other control samples, as described). NMR analysis provided a peak height at 3.6 ppm for the PEG contained in the test sample. PEG content of the test sample was determined relative to the peak-height of the Standard sample. The PEG content of the test and control samples is presented in Table 3.

TABLE 3

Protein analysis of protein-conjugated microparticle samples

| Conjugant | Description of test and control samples | Conjugant content, wt % |
|---|---|---|
| PEG-NH$_2$ | Polymer microparticles only | nd |
| | Microparticles + EDC coupling agent | nd |
| | Particles + PEG-NH$_2$ (no coupling agent) | nd |
| | Particles + PEG-NH$_2$ + EDC | 0.2 wt % | nd = none detected

Example 10: Analysis of Commercial Polymer Having Low Residual Monomer Levels Polymer samples of commercial polymer (from Boehinger Ingleheim (BI); Ingleheim, Germany) that are reported to have low lactide levels were analyzed. The lowest values reported on the Certificates of Analysis by BI are <0.01 wt %. The residual monomer was analyzed by gas chromatography. The analysis method was a gas chromatographic method. Description of method is as follows: Polymer samples were analyzed using a Restek Rtx-1, 30 m×0.53 mm ID, 5 µm Gas chromatograph Column (Restek Inc. Bellefonte, Pa.) at a Helium flow-rate of 24.5 mL/min and Split ratio 4:1. Sample introduction to the Gas Chromatograph was made using an inlet temperature of 145° C. A GC oven ramp program was used with an initial temperature of 125° C. for 7.5 minutes then ramp up to 200° C. at 25° C./minute and hold for 4.5 minutes. Monomer detection was made by FID at 250° C. Polymer samples were dissolved in methylene chloride at a concentration level of 1.5 wt % polymer (0.375 g in 25 mL). Lactide and glycolide standards ranged from 8 to 160 µg/mL) for lactide and 4 to 80 µg/mL for glycolide.

Several measurements were performed, where indicated, at a lower Limit of Quantitation (LOQ) level of 0.002 wt % lactide. In these cases, a single-point calibration standard was prepared at 4 ppm (lactide). Six replicate injections of this standard were performed and the LOQ was estimated to be a level at approximately 10-fold the signal-to-noise ratio of the 4 ppm standard. In these assays, test samples were prepared at a concentration of 6 wt % polymer (0.3 g in 5 mL) to further improve the level of detection. Results of testing the BI samples are summarized in Table 4.

TABLE 4

Residual monomer testing of BI polymers (by GC) (1.5 g polymer/25 mL sample prep conditions)

| | Lactide content (wt %) | |
|---|---|---|
| | As Reported | As Determined |
| BI polymer sample #1, 6535-acid (IV 0.40 dL/g) | 0.05 | 0.049 |
| BI polymer sample #2, 504H, 50:50 acid (IV 0.53 dL/g) | <0.01 | 0.006 |

(LOQ: 0.002)

Example 11: Preparation and Analysis of Polymer Treated by the Disclosed Process A 75:25 PLG polymer (7525 DLG 6A) was obtained from Lakeshore Biomaterials (Birmingham, Ala.) with a high residual monomer level. This polymer was milled to a powder as described in Example 1. This powder was sieved as described in Example 2, except that a 150-µm filter was used instead of a 300-µm filter. This provided a powder with a particle size fraction from 90 to 150 µm in size. This ground and sieved material was then treated as described in Example 4. Results of residual monomer testing of the untreated polymer and the test samples are shown in Table 5.

TABLE 5

Residual monomer testing of untreated and treated Lakeshore Polymer samples (1.5 g polymer/25 mL sample prep conditions)

| | Lactide content (wt %) | |
|---|---|---|
| | As Reported | As Determined |
| Lakeshore polymer 75:25 6A (IV 0.68 dL/g) | 4.1 | |
| Bulk polymer, as-is | | 3.56 |
| Ground & sieved polymer powder (untreated) (90-150 µm particle size fraction) | | 3.54 |
| Treated polymer powder, 90° C., 1 hour | | 0.058 |
| Treated polymer powder, 90° C., 2 hours | | 0.009 |
| Treated polymer powder, 90° C., 3 hours | | 0.002 |

(LOQ = 0.002 wt %)

The spheronization process was effective in reducing lactide levels, even in this case where the material had a very high initial residual lactide level. It is quite possible that starting materials having lower initial lactide levels could have their residual lactide content reduced with shorter treatment times. The residual lactide level reached for this sample was approximately 3-times smaller than the residual monomer level measured on a commercial polymer sample that was reported by the vendor to have residual lactide levels at or below their apparent LOQ (reported lactide level was <0.01 wt %). This shows a significant improvement using this process over that which is currently available from other commercial vendors.

Example 12: Treatment and Analysis of Polymer Treated by Disclosed Process with Variation of Treatment Temperature Two 50:50 PLG polymers were obtained from Lakeshore Biomaterials (Birmingham, Ala.), one having an acid end-group (5050 DLG 4A) and one having an ester (capped) end-group (5050 DLG 3E). The polymers as received each had a similar residual monomer level (1-1.2 wt % lactide content as received from the vendor). The polymers were milled to a powder in a similar manner as described in Example 1. The resulting powders were sieved as described in Example 2. This provided a powder with a particle size fraction from 90 to 300 µm in size.

This ground and sieved polymer powder was then treated as described in Example 4 except that treatment temperatures of 50° C. and 80° C. were used instead of 90° C. and treatment times were varied as specified below (ranging from 2 minutes to 6 hours). Results of residual monomer testing of the starting polymer (as received) and the test samples are shown in Table 6 showing that various treatment temperatures and times can be used to reduce the residual monomer level of the polymer.

GPC molecular weight determinations were also conducted on these samples by GPC. Samples were analyzed in chloroform using a Jordi gel DVB 10000-angstrom, 10×500 mm column (ChromTech Inc) at a flow rate of 1 mL/min. Detection was performed by evaporative light scattering (ELSD) and molecular weights determined by comparison to DIN-certified polystyrene standards (ChromTech Inc.). Weight-average molecular weights are reported in Table 7.

TABLE 6

Residual monomer of untreated and treated polymer samples at various treatment times

| Treatment temperature | Polymer | Lactide content, wt % lactide | | | | |
|---|---|---|---|---|---|---|
| | | 0[a] (untreated) | 2 min | 10 min | 30 min | 6 h |
| 50° C. | 5050 DLG 3E | 1.27 | | | | 0.59 |
| 50° C. | 5050 DLG 4A | 1.19 | | | | 0.66 |
| 80° C. | 5050 DLG 3E | 1.27 | 1.27 | 0.93 | 0.50 | 0.44 |
| 80° C. | 5050 DLG 4A | 1.19 | 1.19 | 0.54 | 0.34 | 0.32 |

[a]Residual lactide content of the untreated polymer as it was received from the vendor.

TABLE 7

Weight average molecular weights (by GPC) of untreated and treated polymer samples at various treatment times (molecular weights in Daltons)

| Treatment temperature | Polymer | Weight average molecular weights by GPC (Daltons) | | | | |
|---|---|---|---|---|---|---|
| | | 0[a] (untreated) | 2 min | 10 min | 30 min | 6 h |
| 50° C. | 5050 DLG 3E | 33,000 | | | | 29,000 |
| 50° C. | 5050 DLG 4A | 40,000 | | | | 39,000 |
| 80° C. | 5050 DLG 3E | 33,000 | 30,000 | 28,000 | 22,000 | |
| 80° C. | 5050 DLG 4A | 40,000 | 38,000 | 33,000 | 29,000 | |

[a]Weight-average molecular weight of the untreated polymer as it was received from the vendor.

Example 13: Treatment and Analysis of Polymer Treated by Disclosed Process Using Additives Two 50:50 PLG polymers were obtained from Lakeshore Biomaterials (Birmingham, Ala.), one having an acid end-group (5050 DLG 4A) and one having an ester (capped) end-group (5050 DLG 3E). The polymers as received each had a similar residual monomer level (1-1.2 wt % lactide content as received from the vendor). The polymers were milled to a powder in a similar manner as described in Example 1. The resulting powders were sieved as described in Example 2. This provided a powder with a particle size fraction from 90 to 300 μm in size.

The ground and sieved polymer powder was then treated as described in Example 4 except that about 1-1.5 grams of ground polymer was treated in 100 grams of a solution consisting of 2 wt % PVA and 1 wt % sodium bicarbonate and the treatment was performed at 50° C. for 6 hours. Results of both residual monomer testing and presented in Table 8.

TABLE 8

Characterization of untreated and treated polymer samples. Treatment was carried out in a PVA solution containing sodium bicarbonate at 50° C. for 6 hours of treatment time

| Polymer | Residual lactide content by GC (wt %) | | Weight-average molecular weight by GPC (daltons) | |
|---|---|---|---|---|
| | Untreated[a] | Treated | Untreated[a] | treated |
| 5050 DLG 3E | 1.08 | 0.17 | 39,000 | 36,000 |
| 5050 DLG 4A | 1.03 | 0.32 | 48,000 | 41,000 |

[a]Result of testing of the untreated polymer as it was received from the vendor.

Example 14: Treatment and Analysis of Polymer Treated by Disclosed Process with Variation of Pretreatment and Treatment Conditions A 50:50 PLG polymer (5050 DLG 3E) was obtained from Lakeshore Biomaterials (Birmingham, Ala.). It had a reported lactide monomer content of 1.2 wt %. This polymer was ground to a fine powder as described in Example 1. This powder was sieved as described in Example 2. This provided a powder with a particle size fraction from of 90 to 300 μm in size. This ground and sieved material was then treated as described in Example 4 with the following modifications.

Samples 1 through 5 were prepared by first pre-treating the polymer with the plasticizer ethanol prior to subsequent treatment by the general method described in Example 4. Briefly, samples 1-5 were prepared by adding about 1.5 grams of the milled and sieved polymer to a 250-mL beaker and then adding 10 grams of ethanol to the beaker. The slurry was stirred for 30 minutes.

Samples 1 and 2 were then transferred into 100 grams of 2 wt % PVA solution at room temperature (rt). Sample 1 was stirred at room temperature for 3 hours; Sample 2 was heated to 50° C. for 3 hours before being collected as described in Example 4.

After the 30-minute treatment with ethanol, Samples 3 and 4 were then diluted with another 100 grams of ethanol. Sample 3 was stirred at room temperature for 3 hours; Sample 4 was heated to 50° C. for 3 hours before being collected as described in Example 4.

Finally, following the 30-minute treatment with ethanol, Sample 5 was transferred into 100 grams of heptane and this slurry was then heated to 5° C. for 3 hours before being collected as described in Example 4.

Samples 6 and 7 were prepared using extruded polymer cylinders, about 10-12 cm in length, which were made as described in Example 3. In these particular samples, about 1-1.5 grams of polymer were treated with 10 grams ethanol for 30 minutes as described previously. Samples 6 and 7 were then transferred to 100 grams of 2 wt % PVA solution. Sample 6 was then stirred at room temperature for 3 hours; Sample 7 was heated to 50° C. for 3 hours before being collected as described in Example 4.

Sample 8 was prepared by pretreating the polymer particles to the plasticizer ethyl acetate instead of ethanol. Pretreatment was conducted by exposing the polymer particles to ethyl acetate in the vapor-state as described previously in Example 5. About 1-1.5 grams of the pre-treated polymer was then added to 100 grams of 2 wt % PVA solution and was heated, with stirring, to 50° C. for 3 hours before being collected as described in Example 4.

Samples 9 and 10 were each prepared by dissolving 2 grams of polymer into 2 grams of ethyl acetate. The concentrated polymer solutions were transferred to a 10-mL syringe to which was affixed an 18-gauge needle. Sample 9 was prepared by injecting the contents of the syringe through the 18-gauge needle and into 100 grams of 2 wt % PVA solution while stirring. The sample was stirred for 3 hours at room temperature. Sample 10 was prepared in a similar fashion except that the contents of the syringe was injected into 100 grams of 2 wt % PVA solution that was heated to 50° C. The sample was stirred for 3 hours at 50° C. prior to collection. Results of residual monomer (lactide) testing and polymer molecular weight analysis are presented in Tables 9 and 10.

TABLE 9

Residual monomer of 5050 DLG 3E polymer samples treated to different pretreatment and treatment conditions (initial Lactide content of untreated polymer was 1.27 wt %)

| Sample Number | Polymer Sample | Polymer pretreatment conditions | Polymer treatment conditions | Residual Lactide content (wt. %)[a] |
|---|---|---|---|---|
| 1 | Particles | Ethanol slurry, 30 min | PVA solution, rt | 0.80 |
| 2 | Particles | Ethanol slurry, 30 min | PVA solution, 50° C. | 0.37 |
| 3 | Particles | Ethanol slurry, 30 min | Ethanol, rt | 0.50 |
| 4 | Particles | Ethanol slurry, 30 min | Ethanol, 50° C. | 0.27 |
| 5 | Particles | Ethanol slurry, 30 min | Heptane, 50° C. | 1.0 |
| 6 | Extrudate | Ethanol slurry, 30 min | PVA solution, rt | 0.8 |
| 7 | Extrudate | Ethanol slurry, 30 min | PVA solution, 50° C. | 0.7 |
| 8 | Particles | Ethyl acetate (vapor) | PVA solution, 50° C. | 0.8 |
| 9 | — | Soln in ethyl acetate | PVA solution, rt | 0.9 |
| 10 | — | Soln in ethyl acetate | PVA solution, 50° C. | 0.6 |

[a]After 3-hour treatment

TABLE 10

Weight average molecular weights (by GPC) of 5050 DLG 3E polymer samples treated to different pretreatment and treatment conditions (initial molecular weight of the untreated polymer was 33,000 daltons).

| Sample Number | Polymer Sample | Polymer pretreatment conditions | Polymer treatment conditions | Weight average molecular weight (daltons)[a] |
|---|---|---|---|---|
| 1 | Particles | Ethanol slurry, 30 min | PVA solution, rt | 28,000 |
| 2 | Particles | Ethanol slurry, 30 min | PVA solution, 50° C. | 26,000 |
| 3 | Particles | Ethanol slurry, 30 min | Ethanol, rt | 26,000 |
| 4 | Particles | Ethanol slurry, 30 min | Ethanol, 50° C. | 28,000 |
| 5 | Particles | Ethanol slurry, 30 min | Heptane, 50° C. | 28,000 |
| 6 | Extrudate | Ethanol slurry, 30 min | PVA solution, rt | 29,000 |
| 7 | Extrudate | Ethanol slurry, 30 min | PVA solution, 50° C. | 28,000 |
| 8 | Particles | Ethyl acetate (vapor) | PVA solution, 50° C. | 27,000 |
| 9 | — | Soln in ethyl acetate | PVA solution, rt | 29,000 |
| 10 | — | Soln in ethyl acetate | PVA solution, 50° C. | 28,000 |

[a]After 3-hr treatment

Example 15: Extrusion-Tinius-Olsen Plastometer (Both Vitamin B12- and Nalmefene Base Extruded drug-polymer bulk extrudate was prepared using a Tinius Olsen Plastometer and a 1.5 mm extrusion die and a set-temperature of 100° C. as described in Example 3.

Starting polymer (Lakeshore 75:25 PLG 6A, from Lakeshore Biomaterials; Birmingham Ala.) was first ground and sieved to a defined particle size range of 90-300 µm as described in Examples 1 and 2. The only exceptions were Samples 4 and 5, which were prepared using polymer powder that had been collected through 90-180 µm screens.

Vitamin B12 was obtained from Spectrum Chemicals (Northhamptonshire, UK). Nalmefene base was obtained by conversion of nalmefene hydrochloride (purchased from Mallinckrodt; Hazelwood, Mo.) to the free base using sodium hydroxide. Blends of the drug and polymer were prepared individually by adding sufficient drug so the blends contained 5 wt % drug in the final drug-polymer blend. These blends were thoroughly mixed and were then used as feed-stock for extrusion using the Tinius-Olsen Plastometer.

The extrusion die was first closed using a plug. About 5 grams of the drug-polymer powder blend was added to the pre-heated barrel of the Tinius-Olsen Plastometer. The Plastometer plunger was inserted into the barrel and a 10-kg extrusion weight was placed on the plunger to compress the powder down to the bottom of the Plastometer. This was maintained for about 5 minutes in order to thermally equilibrate and compress the drug-polymer powder to the bottom of the Plastometer. After the 5-minute equilibration time, the plug on the extrusion die was removed and the extruded material was collected from the Plastometer. The extrudate was cut into smaller sections about 10-15 cm in length.

Example 16: Extrusion-Randcastle RC-0500 ½-Inch Extruder

Extrusion was performed, where indicated, using a Randcastle single-screw extruder with 4 heating zones. All zones were operated at Temperatures of 220° F. (104° C.) except for Zone 1 (located at the feed or input end of the extruder barrel, which was set to an operating temperature of 170° F. (77° C.). A screw speed of 20 rpm was used along with a 1.8 mm diameter extrusion die. A 20-gram blend of powdered drug and polymer was prepared which contained 5% by weight of drug in the final mixture. The polymer powder used in this operation had been sieved as described in Example 2 except that a 180-μm screen was used in place of the 300-μm screen in order to provide a polymer powder having a size range of about 90 to 180 μm. After thoroughly mixing these two materials together, this blend was slowly added to the extruder. The product was cut into 6-10 inch (15.2-25.4 cm) lengths. Extrusion was carried out until the 20 gram blend of drug and polymer had been added to the extruder and the extrudate had finished leaving the extruder.

Example 17: Grinding of Extruded Drug-Polymer Extrudate

The bulk drug-polymer extrudate from both Examples 15 and 16 was ground to a powder as described in Example 1. The extrudate was first cut into 1-2 cm long pieces in preparation for the grinding process. This material was then frozen in liquid nitrogen for 10 minutes prior to milling. The frozen material was then placed in the Retsch mill and ground using a 1.0 mm screen and 12-tooth rotor. The product was then collected, re-frozen, and ground a second time using a 0.5 mm screen and a 24-tooth rotor. All operations were performed at 18,000 rpm.

After the extrusion process, the material was sieved through a 150 μm test sieve. The powdered drug-polymer extrudate that passed through the 150 μm sieve was kept and then dried for about 16 hours (overnight) under vacuum (at room temperature).

Example 18: Treatment of Ground Drug-Polymer Extrudate (Aqueous and Hexane Treatments)

1 to 1.5 grams of the powdered drug-polymer extrudate from Example 17 was weighed into a 250 mL beaker. 100 grams of 2 wt % PVA (polyvinyl alcohol) was weighed into the beaker. Where indicated, the aqueous PVA solution was treated with excess drug to ensure that it was saturated during the heated treatment process. Unless specifically indicated, though, no additional drug was added to the PVA solution during the treatment process. The beaker and its contents were placed on a heat/stir plate (Corning Model PC-320; Corning, N.Y.). An over-head stir motor was set up with a small Teflon turbine impeller. The suspension was stirred at a stir speed of about 1000 rpm with no heat. After 5 minutes, the heated stir plate was turned "on" to a setting of "high." An electronic thermometer was immersed into the contents and the temperature was monitored. Once the temperature of the beaker contents had reached 90° C., a timer was started and the temperature was maintained within ±2° C. After, 30 minute treatment time, the heat plate was turned off and about 100 mL of DI water (at room temperature) was added to the beaker and the suspension was stirred until the temperature dropped to below 50° C. The contents were then poured over a 150 μm sieve onto a 90 μm sieve. The material collected on the 90-μm screen was then rinsed thoroughly with DI water and was then placed in a laminar flow hood for approximately 16 hours to allow the polymer to dry.

Alternatively, treatment was performed in a non-aqueous system. Treatment in hexane was performed similarly to the method above. Approximately 1.2 grams of the powdered drug-polymer extrudate was weighed into a 250 mL beaker containing 200 grams of hexane and 20 grams of Span 85. The hot-plate heating and stirring were carried out as described above. The stirred suspension was heated to 80° C. and was maintained at this temperature for 30 minutes. The heat source was removed and the suspension was allowed to cool (with stirring) until the temperature dropped to below 50° C. At this point, the contents were poured over a 150 μm sieve onto a 90 μm sieve. The material collected on the 90-μm screen was then rinsed thoroughly 1 L of hexane. The product was then placed in a laminar flow hood for approximately 16 hours (overnight) to allow the polymer to dry.

Example 19: Drug Determination of Vitamin B12 Particles 20 to 30 mg of the particles from Example 18 was weighed into a 10 mL screw-top test tube and 2 mL of methylene chloride was added. Particles were allowed to dissolve and 2 mL of water was added and contents were mixed. The test tube was then place in a centrifuge to separate the two layers. The top layer was removed and added to a 25 mL volumetric flask. 2 mL of water was added to the test tube and the above process was repeated twice more. Extracts were combined in one flask and diluted to the mark. An aliquot was removed filtered through a 0.45 μm syringe filter and transferred to a HPLC vial. Vitamin B12 content was determined by a HPLC method (UV at 270 nm). Controls were prepared by weighing drug and polymer and performing the same step as above.

Example 20: In Vitro Release of Vitamin B12 Particles 50 to 60 mg of the particles from Example 18 was weighed into a 20 mL scintillation vial and 10 mL of PBS was added. Vials were placed in a shaker bath whose temperature was maintained at 37° C. and shaking speed of 50 rpm. At the appropriate time point, 1 mL of buffer was removed from the vial avoiding any particles. 1 mL of fresh buffer was replaced and the vial was placed back into the shaker bath until the next time point. The buffer containing released drug was assayed for Vitamin B12 using a HPLC method (UV at 270 nm). Cumulative released vitamin B12 was reported.

Example 21: Drug Determination of Nalmefene Particles 20 to 30 mg of the particles from Example 18 was weighed into a 25 mL volumetric flask and 2 mL of glacial acetic acid was added. Particles were allowed to dissolve. After all of the particles had dissolved, the flask was diluted to volume with PBS. The mixture was filtered using a 0.45 μm syringe filter. Filtered solution was transferred to a HPLC vial and samples analyzed by HPLC (UV at 268 nm). Controls were prepared by weighing drug and polymer and performing the same step as above.

Example 22: In Vitro Release of Nalmefene Particles 50 to 60 mg of the particles from Example 18 was weighted into a 20 mL scincillation vial and 20 mL of PBS containing 0.5 wt % SDS (sodium dodecylsulfate) was added. Vials were placed in a shaker bath whose temperature was maintained at 37° C. and shaking speed of 50 rpm. At the appropriate time point, 1 mL of buffer was removed from the vial, avoiding any particles. 1 mL of fresh buffer was replaced and the vial was placed back into the shaker bath until the next time point. The buffer containing released drug was assayed for Nalmefene using a HPLC method (UV at 268 nm). Cumulative released vitamin Nalmefene is reported.

The results of Examples 19-22 are shown in Tables 11-12 below.

TABLE 11

Preparation and characterization of drug-loaded samples

| Drug | Sample | Treatment conditions | Actual drug loading, wt % |
|---|---|---|---|
| Vitamin B12 | 1 | 2 wt % PVA in water | 1.2 |
| | 2 | Span 85 in hexane | 4.9 |
| Nalmefene base | 3 | 2 wt % PVA in water | 0.65 |
| | 4[a] | 2 wt % PVA in water | 1.56 |
| | 5[a] | 2 wt % PVA in water (saturated with drug) | 6.2[b] |
| | 6[c] | 2 wt % PVA in water | 1.73 |
| | 7[c] | 2 wt % PVA in water (saturated with drug) | 5.48[b] |

[a]Samples 4 and 5 were prepared using polymer powder collected with a particle size of 90-180 μm; other samples were prepared from polymer powder collected across a particle size range of 90-300 μm.
[b]Saturation during the treatment step leaves small amounts of free drug in the final product.
[c]The drug-polymer extrudate from these samples was prepared using a ½ inch Randcastle single screw extruder; all other samples were made using the Tinius-Olsen Plastometer.

TABLE 12

In vitro Release screening

| Drug | Sample | Drug loading, wt % | Cumulative percent release, % | | | |
|---|---|---|---|---|---|---|
| | | | Day 1 | Day 2 | Day 3 | Day 5 |
| Vitamin B12 | 1 | 1.2 | 1.2 | 3.0 | 4.2 | |
| | 2 | 4.9 | 60.4 | 65.3 | 75.5 | |
| Nalmefene base | 4 | 1.56 | 1.2 | 3.0 | 3.5 | 4.0 |
| | 5 | 6.23 | 70.5 | 80.7 | 80.6 | 80.7 |
| | 6 | 1.73 | 8.9 | 11.2 | 11.9 | 12.1 |
| | 7 | 5.48 | 69.5 | 81.7 | 82.3 | |

Trials where the PVA solution was saturated with drug were made to minimize extraction. This helped as final loading levels were high (up at/above the 5% input levels). Values above 5% reflect the fact that the saturated PVA solutions actually contained extra free drug stirring in the system to ensure that this solution was, in fact, fully saturated. This residual free drug ended up being collected along with the final particle product causing apparent drug levels to be higher than the starting (theoretical) levels. However, when these high-loaded samples were put through the in vitro testing, fast initial release (burst) of drug was observed at the Day 1 time interval.

The other samples having 1-2% drug loadings (i.e., Samples 1, 4, and 6) further demonstrate that the final product is able to be used for sustained release of drug in the in vitro system.

Example 23: Analysis of Drug Loading

The remaining drug was extracted out from the microsphere samples themselves from the remaining samples at the end of the studies (as outlined in Table 12). This drug was then quantified in order to demonstrate mass balance of the released drug to the total quantity of drug used in the sample. Results demonstrate that mass balance was achieved, namely, that the remaining drug that had not been released in the in vitro release experiment was, indeed, found and accounted for as being entrapped within the remaining particle samples. The results are shown in Table 13.

TABLE 13

Mass balance of drug loading at termination of in vitro screening

| Sample | Drug loading, wt % | % of dose released at conclusion of the in vitro study | % of dose recovered from sample at end of in vitro study | Percent of dose accounted for at end of study |
|---|---|---|---|---|
| 1 | 1.2 | 4.2 | 91.3 | 95.3 |
| 2 | 4.9 | 75.5 | 24.1 | 98.5 |
| 4 | 1.56 | 4.0 | 97.8 | 101.9 |
| 5 | 6.23 | 80.7 | 19.2 | 99.6 |
| 6 | 1.73 | 12.1 | 85.4 | 97.2 |
| 7 | 5.48 | 82.3 | 17.6 | 99.5 |

Example 24: Extrusion-Tinius-Olsen Plastometer (Risperidone in Polycaprolactone)

Extruded drug-polymer bulk extrudate was prepared using a Tinius-Olsen Plastometer and a 1.2 mm extrusion die and a set-temperature of 80° C. In this Example, the polymer polycaprolactone was used (Aldrich Chemicals) after first grinding and sieving it to a size range of 90-300 µm as described in Examples 1 and 2.

Drug powder (risperidone from Jubilant Organosys LTD; Mysore, India), was added to the polymer powder in sufficient quantities in order to prepare blends containing 10% drug by weight of the final blend. The drug and polymer powders were then thoroughly blended together. This blended powder of drug and polymer was then used as the feed stock for extrusion using the Tinius-Olsen Plastometer.

The extrusion die was first closed using a plug. About 5 grams of the drug-polymer powder blend was added to the pre-heated barrel of the Tinius-Olsen Plastometer. The Plastometer plunger was inserted into the barrel and a 10-kg extrusion weight was placed on the plunger to compress the powder down to the bottom of the Plastometer. This was maintained for about 5 minutes in order to thermally equilibrate and compress the drug-polymer powder to the bottom of the Plastometer. After the 5-minute equilibration time, the plug on the extrusion die was removed and the extruded material was collected from the Plastometer. The extrudate was cut into smaller sections about 10-15 cm in length.

Example 25: Treatment of Ground Drug-Polymer Extrudate 1 to 1.5 grams of the powdered drug-polymer extrudate from Example 24 was cut in to small segments 1-2 mm with a razor blade and ground and sieve as indicated in Example 17.

100 grams of 2 wt % PVA (polyvinyl alcohol) was weighed into the beaker. The beaker and its contents were placed on a heat/stir plate (Corning Model PC-320; Corning, N.Y.). An over-head stir motor was set up with a small Teflon turbine impeller. The suspension was stirred at a stir speed of about 1000 rpm with no heat.

After 5 minutes, the heated stir plate was turned "on" to a setting of "high." An electronic thermometer was immersed into the contents and the temperature was monitored. Once the temperature of the beaker contents had reached 90° C., a timer was started and the temperature was maintained at 90° C. for 30 minutes. During this time, the temperature was maintained within ±2° C. After 30 minutes treatment time, the heat plate was turned off and about 100 mL of DI water (at room temperature) was added to the beaker and the suspension was stirred until the temperature dropped to below 50° C. The contents were then poured onto a 90 µm sieve. The material collected on the 90 µm screen was then rinsed thoroughly with DI water and was then placed in a laminar flow hood for approximately 16 hours to dry.

Example 26: Drug Determination of Risperidone Particles 20 to 30 mg of the particles from Example 25 was weighed into a 25 mL volumetric flask and 2 mL of glacial acetic acid was added. Particles were allowed to dissolve. After all of the particles had dissolved, the flask was diluted to volume with PBS. The mixture was filtered using a 0.45 µm syringe filter. Filtered solution was transferred to a HPLC vial and samples analyzed by HPLC (UV at 268 nm). Controls were prepared by weighing drug and polymer and performing the same step as above. Results are presented in Table 14.

Example 27: In Vitro Release of Risperidone Particles 50 to 60 mg of the particles from Example 25 was weighted into a 20 mL scintillation vial and 50 mL of PBS was added. Vials were placed in a shaker bath whose temperature was maintained at 37° C. and shaking speed of 50 rpm. At the appropriate time point, 10 mL of buffer was removed from the vial, avoiding any particles. 10 mL of fresh buffer was replaced and the vial was placed back into the shaker bath until the next time point. The buffer containing released drug was assayed for Risperidone using a HPLC method (UV at 268 nm). Cumulative released Risperidone is reported in Table 15. Mass balance was conducted on the particles at the conclusion of the in vitro release experiment to demonstrate that the particles still contained drug for continued release as described earlier in Example 23. Results are presented in Table 16. The results of Examples 24-27 are shown in Tables 14-16 below.

TABLE 14

Characterization of risperidone-polycaprolactone particles

| Drug | Sample | Treatment conditions | Actual Drug Loading, wt % |
|---|---|---|---|
| Risperidone | 8 | 2 wt % PVA in water | 5.2 |

TABLE 15

In vitro Release Screening of risperidone-polycaprolactone particles

| | | Drug loading, | Cumulative percent release % | | | |
|---|---|---|---|---|---|---|
| Drug | Sample | wt % | Day 1 | Day 2 | Day 3 | Day 5 |
| Risperidone | 8 | 5.2 | 1.0 | 3.0 | 4.5 | 4.7 |

TABLE 16

Mass balance of drug loading at termination of in vitro screening

| Sample | Drug Loading wt % | % of dose released at conclusion of the in vitro study | % of dose recovered from sample at end of in vitro study | Percent of dose accounted for at end of study |
|---|---|---|---|---|
| 1 | 5.2 | 4.7 | 94.2 | 98.9 |

Example 28: Extrusion-Tinius-Olsen Plastometer (Coumarin 6 in 50:50 PLG)

Extruded drug-polymer bulk extrudate that were prepared using a Tinius-Olsen Plastometer were done so using a 1.2 mm extrusion die and a set-temperature of 80° C. The starting polymer, a 50:50 PLG (5050 DLG 3E) from Lakeshore Biomaterials, was first ground and sieved to a defined particle size range of 90-300 µm as described in Examples 1 and 2, respectively.

4 grams of the ground and sieve polymer was dissolved in methylene chloride at 10 wt % polymer concentration. Coumarin 6 (Polysciences Inc, Warrington, Pa.) was added to the polymer solution at a loading of 0.5 wt % based on the total combined weight of polymer and coumarin. A polymer-coumarin film was obtained by evaporation of this solution on a fluoropolymer film. The resulting cast-film was then cut up in small pieces in order to prepare feed stock for the Tinius Olsen Plastometer.

The extrusion die was first closed using a plug. About 3 grams of the prepared film pieces was added to the pre-heated barrel of the Tinius-Olsen Plastometer. The Plastometer plunger was inserted into the barrel and a 10-kg extrusion weight was placed on the plunger to compress the powder down to the bottom of the Plastometer. This was maintained for about 5 minutes in order to thermally equilibrate and compress the drug-polymer powder to the bottom of the Plastometer. After the 5-minute equilibration time, the plug on the extrusion die was removed and the extruded material was collected from the Plastometer. The extrudate was cut into smaller sections about 10-15 cm in length.

Example 29: Treatment of Coumarin-Polymer Segments 1 to 1.5 grams of the powdered drug-polymer extrudate from Example 28 was cut in to small segments 1-2 mm with a razor blade. 100 grams of 2 wt % PVA (polyvinyl alcohol) was weighed into the beaker. The beaker and its contents were placed on a heat/stir plate (Corning Model PC-320; Corning, N.Y.). An over-head stir motor was set up with a small Teflon turbine impeller. The suspension was stirred at a stir speed of about 1000 rpm with no heat.

After 5 minutes, the heated stir plate was turned "on" to a setting of "high." An electronic thermometer was immersed into the contents and the temperature was monitored. Once the temperature of the beaker contents had reached 90° C., a timer was started and the temperature was maintained at 90° C. for 30 minutes. During this time, the temperature was maintained within ±2° C. After 30 minutes treatment time, the heat plate was turned off and about 100 mL of DI water (at room temperature) was added to the beaker and the suspension was stirred until the temperature dropped to below 50° C. The contents were then poured onto a 90 µm sieve. The material collected on the 90 µm screen was then rinsed thoroughly with DI water and was then placed in a laminar flow hood for approximately 16 hours to dry.

Figure 11:
FIG. 11 is a SEM photomicrograph of the untreated Coumarin-6/polymer extrudate (scale represents 1 mm).
Figure 12:
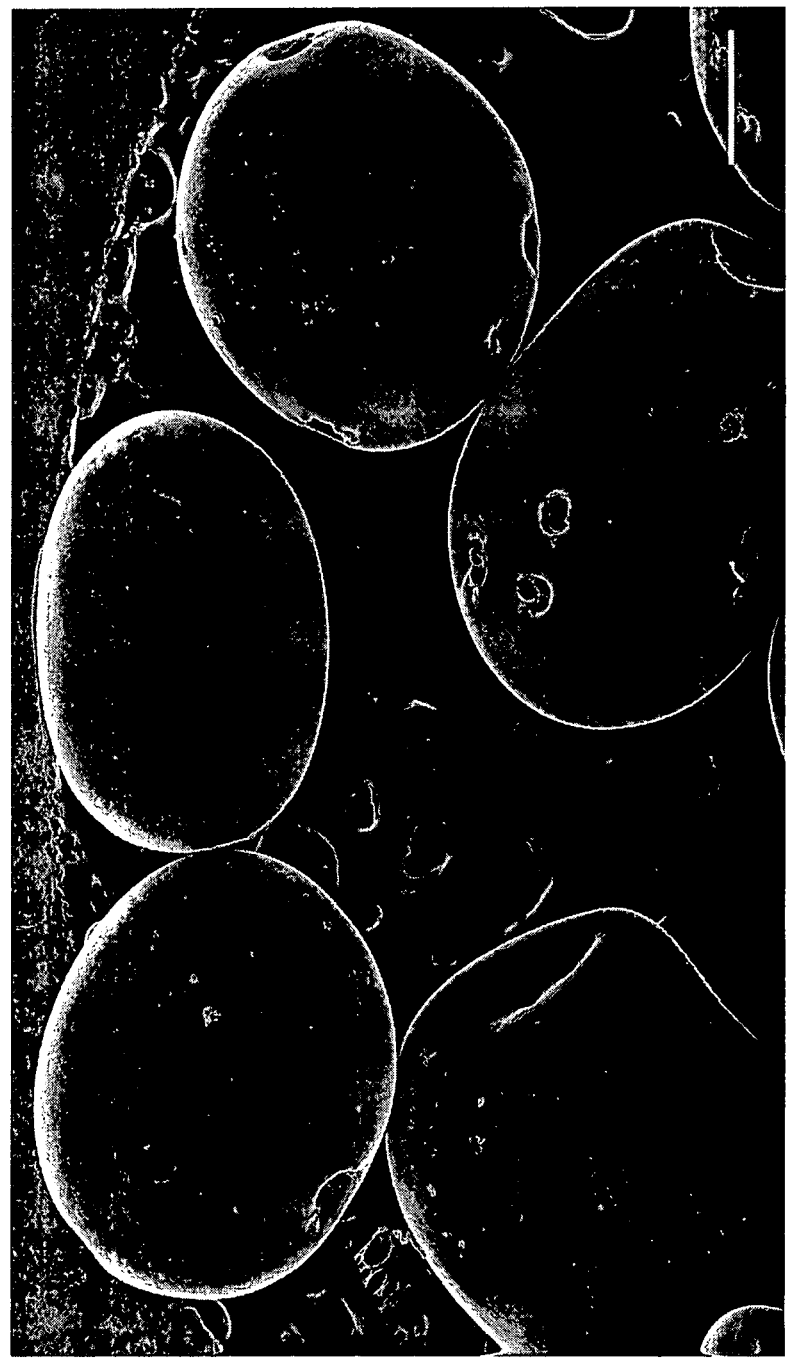
FIG. 12 is a SEM photomicrograph of the treated Coumarin-6/polymer extrudate (scale represents 0.5 mm).

FIGS. 11 and 12 show SEM photomicrographs of the untreated and the treated coumarin-6 polymer extrudate, respectively.

Example 30: Extrusion of Iron-Oxide and 50:50 PLG

Extrusion was carried out with a 50:50 PLG and iron oxide magnetic nanoparticles using the Tinius-Olsen Plastometer. Extrusion was conducted using a 1.2 mm extrusion die and a set-temperature of 100° C. The polymer, a 5050 DLG 3E from Lakeshore Biomaterials, was first ground and sieved to a defined particle size range of 90-300 µm as described in Examples 1 and 2, respectively.

Magnetic nanoparticles (Magnetic Nano Particles, Ferro-Tec Coporation Japan), were added to the polymer powder in sufficient quantities in order to prepare blends containing 10% nanoparticles by weight of the final blend. The nanoparticles and polymer powders were then thoroughly blended together. This blended powder of nanoparticles and polymer was then used as the feed stock for extrusion using the Tinius-Olsen Plastometer.

The extrusion die was first closed using a plug. About 5 grams of the nanoparticles/polymer powder blend was added to the pre-heated barrel of the Tinius-Olsen Plastometer. The Plastometer plunger was inserted into the barrel and a 10-kg extrusion weight was placed on the plunger to compress the powder down to the bottom of the Plastometer. This was maintained for about 5 minutes in order to thermally equilibrate and compress the drug-polymer powder to the bottom of the Plastometer. After the 5-minute equilibration time, the plug on the extrusion die was removed and the extruded material was collected from the Plastometer. The extrudate was cut into smaller sections about 10-15 cm in length.

Figure 13:
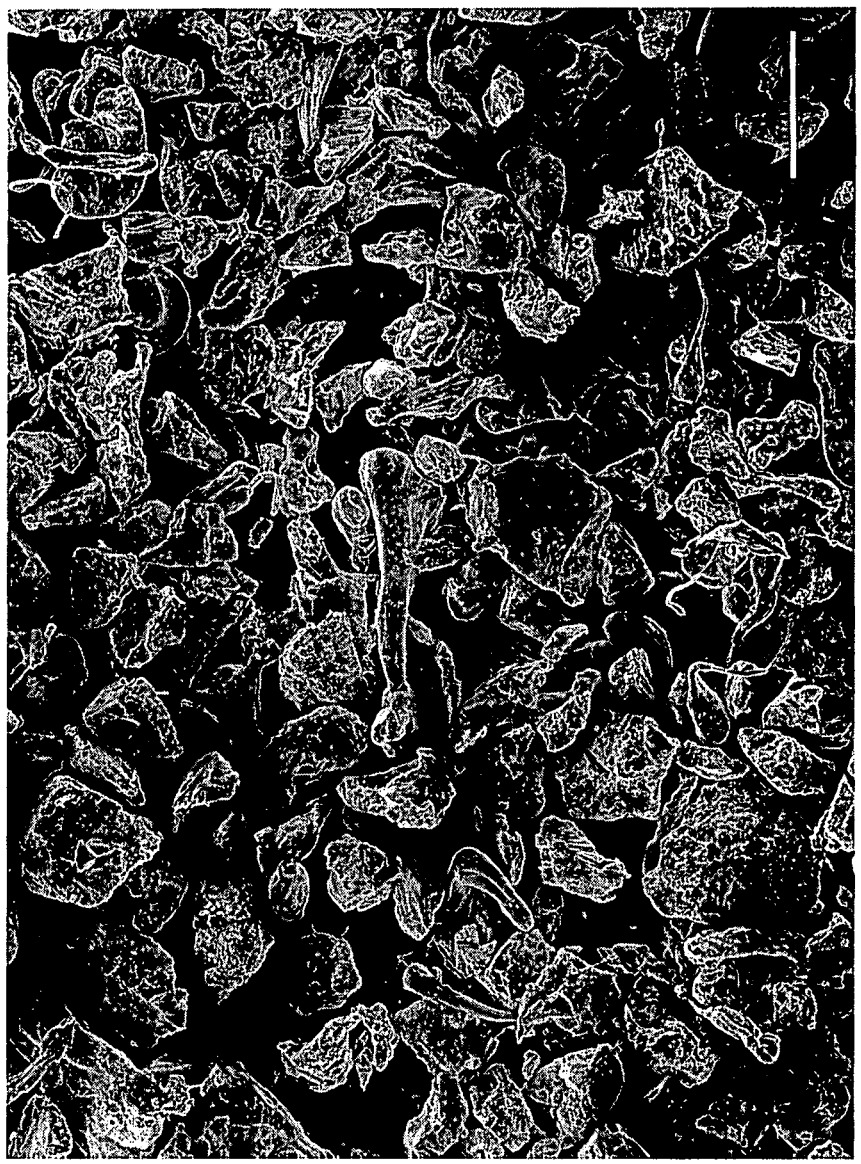
FIG. 13 is a SEM photomicrograph of milled iron oxide/polymer particles (scale represents 0.25 mm).

Example 31: Treatment of Ground Nanoparticles-Polymer Extrudate 1 to 1.5 grams of the powdered nanoparticles-polymer extrudate from Example 30 was cut into small segments 1-2 mm in length with a razor blade which were then ground and sieved as indicated in Example 17 (FIG. 13).

100 grams of 2 wt % PVA (polyvinyl alcohol) was weighed into the beaker. The beaker and its contents were placed on a heat/stir plate (Corning Model PC-320; Corning, N.Y.). An over-head stir motor was set up with a small Teflon turbine impeller. The suspension was stirred at a stir speed of about 1000 rpm with no heat.

Figure 14:
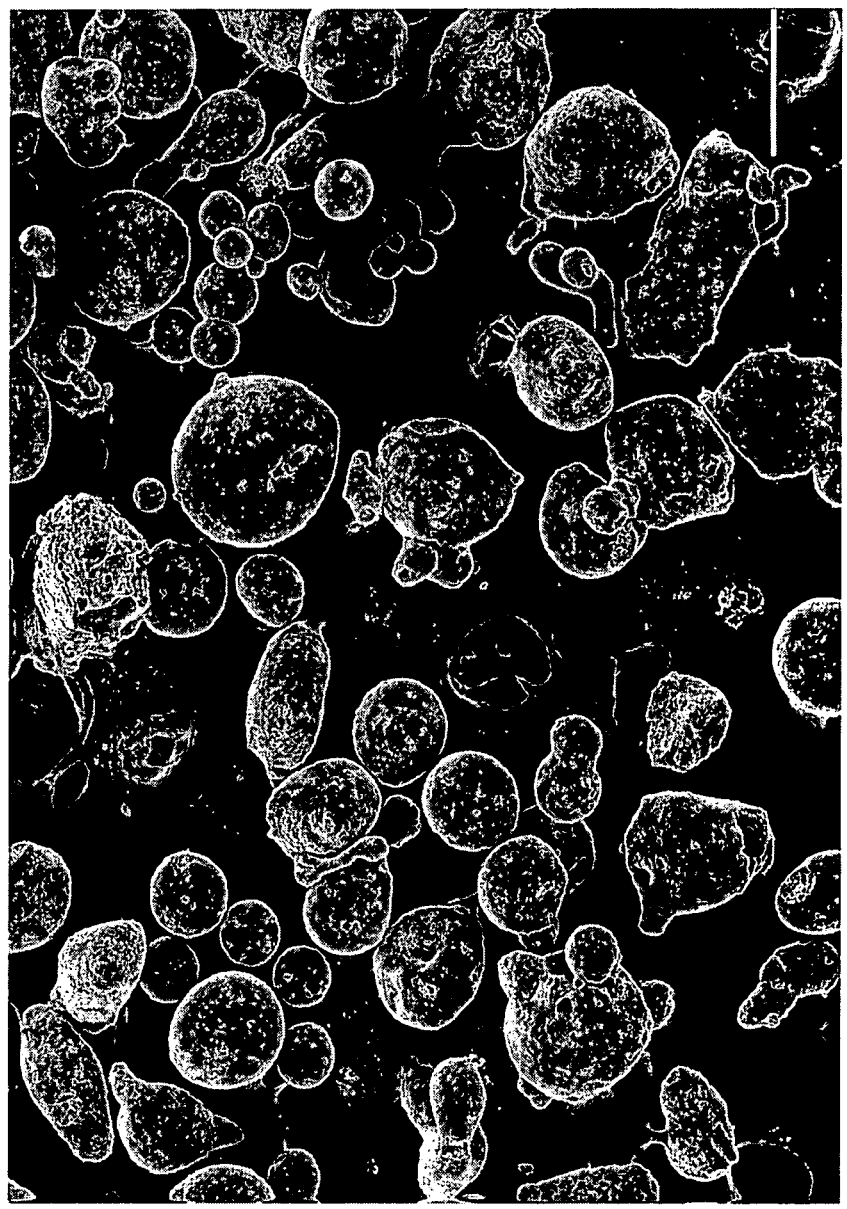
FIG. 14 is a SEM photomicrograph of treated iron oxide/polymer particles (scale represents 0.25 mm).

After 5 minutes, the heated stir plate was turned "on" to a setting of "high." An electronic thermometer was immersed into the contents and the temperature was monitored. Once the temperature of the beaker contents had reached 90° C., a timer was started and the temperature was maintained at 90° C. for 30 minutes. During this time, the temperature was maintained within ±2° C. After 30 minutes treatment time, the heat plate was turned off and about 100 mL of DI water (at room temperature) was added to the beaker and the suspension was stirred until the temperature dropped to below 50° C. The contents were then poured onto a 90 µm sieve. The material collected on the 90 µm screen was then rinsed thoroughly with DI water and was then placed in a laminar flow hood for approximately 16 hours to dry. FIGS. 13 and 14 show SEM photomicrographs of the untreated and the treated iron oxide/polymer extrudate, respectively.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of producing a spheroid polymer particle, comprising:
   a. providing a mixture comprising a non-spheroid polymer particle and a liquid medium, wherein the polymer particle comprises one or more secondary components selected from the group consisting of pharmaceutical, biomolecule, imaging agent, targeting moiety, or magnetic particle, wherein the liquid medium comprises a surfactant; and wherein the polymer particle is at least partially insoluble in the liquid medium;

b. heating the mixture above the glass transition temperature or the melting temperature of the polymer while mixing the mixture; and c. cooling the mixture to below the glass transition temperature or melting temperature of the polymer, thereby producing a spheroid polymer particle;

wherein the non-spheroid polymer particle comprises a poly(lactide-glycolide) copolymer, lactide homopolymer, glycolide homopolymer, caprolactone, or a mixture thereof.

2. The method of claim 1, wherein the non-spheroid polymer particle is a ground polymer or a cutting from a polymeric rod or fiber extrudate.

3. The method of claim 1, wherein the non-spheroid polymer particle is contacted with a plasticizer prior to step a, prior to step b, or during step b.

4. The method of claim 1, wherein the liquid medium is water.

5. The method of claim 1, wherein the surfactant is polyvinylalcohol.

6. The method of claim 1, wherein the liquid medium comprises an additive.

7. The method of claim 1, wherein the spheroid particle is from about 1 μm to about 1000 μm in diameter.

8. The method of claim 1, further comprising attaching a secondary component to the surface of the spheroid polymer particle.

9. A method of reducing monomer content of a polymer particle, comprising:
   a. providing a mixture comprising a first polymer particle having an initial residual monomer content and a liquid medium, wherein the first polymer particle comprises one or more secondary components selected from the group consisting of pharmaceutical, biomolecule, imaging agent, targeting moiety, or magnetic particle, wherein the liquid medium comprises a surfactant; and wherein the first polymer particle is at least partially insoluble in the liquid medium;
   b. heating the mixture above the glass transition temperature or the melting temperature of the polymer while mixing the mixture; and
   c. cooling the mixture to below the glass transition temperature or melting temperature of the polymer,
   thereby producing a second polymer particle having a monomer content that is less than the initial residual monomer content;
   wherein the first polymer particle comprises a poly(lactide-glycolide) copolymer, lactide homopolymer, glycolide homopolymer, caprolactone, or a mixture thereof.

10. The method of claim 9, wherein the first polymer particle is a ground polymer or a cutting from a polymeric rod or fiber extrudate.

11. The method of claim 9, wherein the first polymer particle is contacted with a plasticizer prior to step a, prior to step b, or during step b.

12. The method of claim 9, wherein the liquid medium is water.

13. The method of claim 9, wherein the surfactant is polyvinylalcohol.

14. The method of claim 9, wherein the second polymer particle is from about 1 μm to about 1000 μm in diameter.

15. The method of claim 9, further comprising attaching a secondary component to the surface of the particle.

16. The method of claim 1, wherein the non-spheroid polymer particle has a length×width×height of from about 40 μm3 to about 1 mm3.

17. The method of claim 9, wherein the first polymer particle has a length×width×height of from about 40 μm3 to about 1 mm3.

18. The method of claim 1, wherein the spheroid polymer particle is from about 20 μm to about 1000 μm in diameter.

19. The method of claim 1, wherein the spheroid polymer particle is from about 50 μm to about 1000 μm in diameter.

20. The method of claim 9, wherein the spheroid polymer particle is from about 20 μm to about 1000 μm in diameter.

21. The method of claim 9, wherein the second polymer particle is from about 50 μm to about 1000 μm.

22. A method of producing a spheroid polymer particle, comprising:
   a. providing a mixture comprising a non-spheroid polymer particle and a liquid medium, wherein the polymer particle comprises one or more secondary components selected from the group consisting of pharmaceutical, biomolecule, imaging agent, targeting moiety, or magnetic particle, wherein the liquid medium comprises a surfactant; and wherein the polymer particle is at least partially insoluble in the liquid medium;
   b. heating the mixture above the glass transition temperature or the melting temperature of the polymer while mixing the mixture; and
   c. cooling the mixture to below the glass transition temperature or melting temperature of the polymer,
   thereby producing a spheroid polymer particle; and
   d. attaching a secondary component to the surface of the spheroid polymer particle,
   wherein the non-spheroid polymer particle comprises a poly(lactide-glycolide) copolymer, lactide homopolymer, glycolide homopolymer, caprolactone, or a mixture thereof.

23. The method of claim 22, wherein the secondary component comprises collagen.

* * * * *